(12) United States Patent
Darvishian

(10) Patent No.: US 9,896,975 B1
(45) Date of Patent: Feb. 20, 2018

(54) SYSTEMS AND METHODS OF CONVERTING HEAT TO ELECTRICAL POWER

(71) Applicant: Masoud Darvishian, Damghan (IR)

(72) Inventor: Masoud Darvishian, Damghan (IR)

( * ) Notice: Subject to any disclaimer, the term of this patent is extended or adjusted under 35 U.S.C. 154(b) by 0 days.

(21) Appl. No.: 15/724,572

(22) Filed: Oct. 4, 2017

Related U.S. Application Data

(63) Continuation-in-part of application No. 15/483,225, filed on Apr. 10, 2017, now Pat. No. 9,790,816.

(51) Int. Cl.
| | |
|---|---|
| *F01K 25/08* | (2006.01) |
| *F01B 17/02* | (2006.01) |
| *F01K 27/00* | (2006.01) |
| *F01B 29/10* | (2006.01) |
| *F01B 17/00* | (2006.01) |
| *F02C 6/06* | (2006.01) |
| *F02C 6/00* | (2006.01) |
| *F02C 6/04* | (2006.01) |

(52) U.S. Cl.
CPC ............ *F01K 25/08* (2013.01); *F01B 17/00* (2013.01); *F01B 17/02* (2013.01); *F01B 17/022* (2013.01); *F01B 29/10* (2013.01); *F01K 27/00* (2013.01); *F01K 27/005* (2013.01); *F02C 6/00* (2013.01); *F02C 6/04* (2013.01); *F02C 6/06* (2013.01)

(58) Field of Classification Search
CPC ........ F01K 25/08; F01K 27/005; F01K 27/00; F01B 17/02; F01B 17/022; F01B 17/00; F01B 29/10; F02C 6/04; F02C 6/00; F02C 6/06
USPC ......... 60/508, 509, 512, 515, 643, 651, 670, 60/671, 721, 413
See application file for complete search history.

(56) References Cited

U.S. PATENT DOCUMENTS

| | | | | |
|---|---|---|---|---|
| 8,046,990 | B2 * | 11/2011 | Bollinger | H02J 15/006 60/410 |
| 8,495,872 | B2 * | 7/2013 | McBride | F15B 11/06 60/511 |
| 8,850,808 | B2 * | 10/2014 | Ingersoll | F03D 9/028 60/413 |
| 9,790,816 | B1 * | 10/2017 | Darvishian | F01K 25/08 |
| 2010/0275590 | A1 * | 11/2010 | Harazim | F04B 17/00 60/508 |

* cited by examiner

*Primary Examiner* — Hoang Nguyen
(74) *Attorney, Agent, or Firm* — Chen Huang; Adli Law Group P.C.

(57) ABSTRACT

This invention presents methods and system for conversion of heat to electrical power through absorption of heat from any types of fluids with temperatures both higher and lower than 0° C. Heat can be absorbed from fossil or renewable energy resources. The mechanism in this invention uses a fluid or fluids' enthalpy and internal energy difference to generate power, where a reciprocating piston-cylinder system provides the required force to rotate a turbine for power generation.

20 Claims, 14 Drawing Sheets

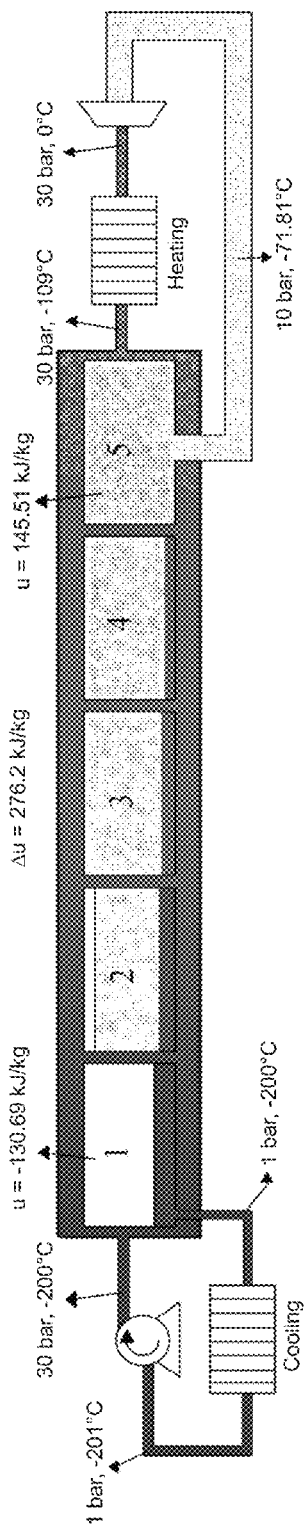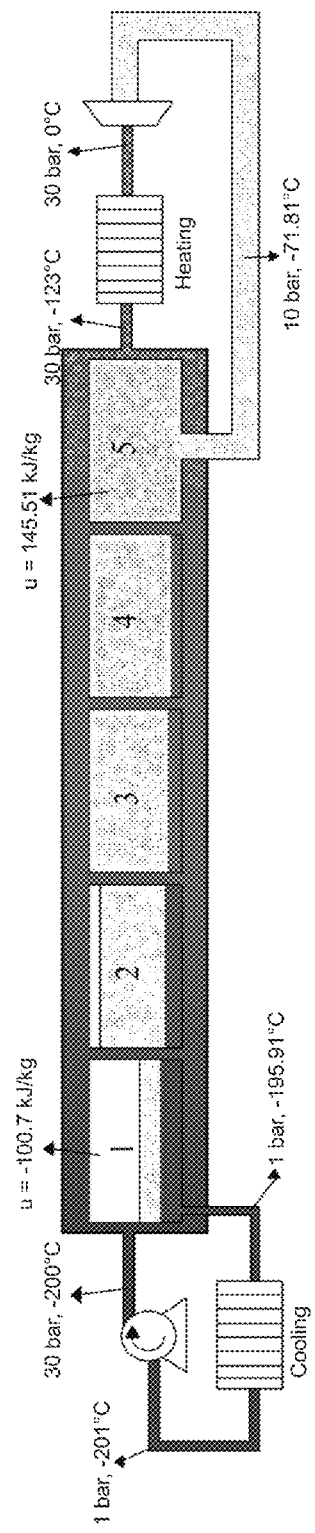
Fig. 4A
Fig. 4B

SYSTEMS AND METHODS OF CONVERTING HEAT TO ELECTRICAL POWER

CROSS-REFERENCE TO RELATED PATENT APPLICATIONS

Embodiments of the present invention relate to U.S. Nonprovisional application Ser. No. 15/483,225, filed Apr. 10, 2017, entitled "SYSTEMS AND METHODS OF CONVERTING HEAT TO ELECTRICAL POWER", the contents of which are incorporated by reference herein in its entirety and which is a basis for a claim of priority.

FIELD OF THE DISCLOSURE

The present disclosure generally relates to methods and systems for generating electrical power. More specifically, the present disclosure provides methods and systems that convert heat energy to electrical power through absorption of heat from any types of fluid at roughly any temperature, where the fluid may further be converted to drinking water.

BACKGROUND OF THE DISCLOSURE

Today, global warming resulted from fossil fuels consumption and the interactions between the earth and the living creatures have caused air and sea pollution, water shortage, environmental damages, and a variety of diseases for the humans. Due to the growing demand for different types of energy, various approaches have been utilized for generating electrical power. Often, the produced electrical power may not be stored due to the high level of power consumption in different countries and its consequent high storage cost. Renewable energy resources such as sunlight, wind, sea waves, and tides are not usually available during a 24-hour period, while a combined-cycle power plant with a low-cost fuel can be used to dynamically generate as much power as required. However, this can lead to irrecoverable complications for humans and the environment.

Further, while thermal power plants can convert thermal energy from any fuel type to mechanical energy to generate electrical power with operational temperatures ranging from 100° C. to 1500° C., this method only converts about up to 60 percent of the thermal energy to electrical power in the best-case scenario. Therefore, achieving new methods for power generation is of great importance.

Accordingly, there exists a need for improved methods and systems for converting heat to electrical power that is available all the time, reducing impact to the environment and providing higher percentage of energy conversion. There also exists a need for improved methods and systems for enhancing the efficiency of current power plants so that pollutions can be reduced or eliminated entirely.

SUMMARY OF THE DISCLOSURE

One objective of the present disclosure is to provide a method and system for converting heat to electrical power through absorption of heat from any types of material (e.g., fluids) with temperatures both higher and lower than 0° C. Heat can be absorbed from fossil or renewable energy resources. The mechanism in the present disclosure uses fluid's internal energy and enthalpy difference to produce force required to rotate the turbine of a reciprocating piston-cylinder system, thereby generates electrical power.

Another objective of the present disclosure is to achieve a simple, inexpensive method to produce electricity and optionally fresh water from the renewable energy sources which are usually at hand. This method should be capable of absorbing energy from any heat source to convert them to electricity.

In accordance with one embodiment of the present disclosure, a system for converting heat to electrical power utilizing Enthalpy and Internal-energy Difference (E.I.D.) of a fluid or fluids is disclosed. The disclosed E.I.D system comprises: (1) a cooling mechanism; (2) a pump that compresses a fluid; (3) a first heat exchanger that reduces the fluid's temperature through the cooling mechanism before the fluid enters the pump; (4) a plurality of cylinders, where each cylinder comprises a reciprocating piston and is being injected with the fluid; (5) a pipe that is configured to be in contact with the plurality of cylinders allowing the fluid from the pump to pass through the pipe and contact the plurality of cylinders' casings, and to absorb energy of the fluid in the plurality of cylinders, causing the fluid in the plurality of cylinders to expand; (6) a second heat exchanger that increases the fluid's temperature through the cooling mechanism after the fluid exits the plurality of cylinders.

The reciprocating piston for each of the plurality of cylinders moves when the fluid is injected into the plurality of cylinders or when the fluid's temperature changes in the plurality of cylinders, and the reciprocating piston for each of the plurality of cylinders is connected to a hydraulic system and power is generated when the reciprocating piston moves.

The cooling mechanism comprises a compressor that compresses a second fluid between the first heat exchanger and the second heat exchanger, and a first turbine that expands the second fluid and reduces the second fluid's temperature.

In one embodiment, the system further comprises a third heat changer that is connected to an additional power generating system to generate additional electrical power. In one build, the additional power generating system may comprises a first turbine that decreases a working fluid's pressure, a cooling heat exchanger that cools down the working fluid, a pump that compresses the working fluid, a heating heat exchanger that heats the working fluid, and a second turbine that generates power. The additional power generating system may further comprise a compressor that removes gases which are not converted to liquid in the cooling heat exchanger. In another build, the additional power generating system comprises a first turbine that decreases a working fluid's pressure, a fourth heat exchanger that exchanges energy between the working fluid cooled by a cooling heat exchanger and compressed by a pump and the working fluid output by the first turbine, a heating heat exchanger that heats the working fluid, and a second turbine that generates power. The additional power generating system in this build may also comprises a compressor that removes gases which are not converted to liquid in the cooling heat exchanger or the fourth heat exchanger.

In accordance with another embodiment of the present disclosure, a system for converting heat to electrical power is disclosed. The system comprises: (1) a pump that compresses a first fluid; (2) a first heat exchanger that uses a second fluid to fix the first fluid's temperature; (3) a plurality of cylinders, where each cylinder comprises a reciprocating piston and is being injected with the first fluid; (4) a pipe that is configured to be in contact with the plurality of cylinders allowing the first fluid from the pump to pass through the pipe and contact the plurality of cylinders' casings, and to absorb energy of the first fluid in the plurality of cylinders, causing the first fluid in the plurality of cylinders to expand; (5) a second heat exchanger that transfers energy of the first fluid passing through and exiting the plurality of cylinders to the second fluid; (6) a compressor that compresses the second fluid between the first heat exchanger and the second heat exchanger, and the compressed second fluid is cooled down by the second exchanger or other fluid; (7) a first turbine that expands the second fluid and reduces the second fluid's temperature, and transfers the second fluid to the first heat exchanger to maintain low temperature of the first fluid; and (8) a third heat exchanger that absorbs energy from an external fluid to increase energy of the first fluid. The reciprocating piston for each of the plurality of cylinders moves when the first fluid is injected into the plurality of cylinders or when the first fluid's temperature changes in the plurality of cylinders. Since the reciprocating piston for each of the plurality of cylinders is connected to a hydraulic system, power is generated when the reciprocating piston moves.

In accordance with another embodiment of the present disclosure, a method for converting heat to electrical power is disclosed. The method comprises: (1) compressing an external first fluid; (2) fixing or reducing the external first fluid's temperature using a second fluid through a first heat exchanger, which causes the second fluid's temperature to rise; (3) causing the external fluid to be in contact with a plurality of containers, where each of the plurality of containers has a reciprocating piston and contains an internal first fluid, and the external first fluid absorbs the internal first fluid's heat energy through the plurality of containers and causes the internal first fluid to expand; (4) reducing the second fluid's temperature; (5) causing the external first fluid's heat energy to be absorbed by the second fluid through a second heat exchanger; (6) causing the external first fluid to absorb heat energy from air or another fluid through a third heat exchanger; (7) injecting the external first fluid into the plurality of containers, where the external first fluid becomes the internal first fluid; wherein the reciprocating piston moves when the internal first fluid expands and power is generated; and (9) directing the internal first fluid leaving the plurality of containers to the first heat exchanger, where the internal first fluid becomes the external first fluid and the first fluid's temperature is fixed and reduced by the first heat exchanger. The cycle is than repeated to continue power generation.

The disclosed systems and methods are capable of absorbing heat from renewable and non-renewable sources and turn them into electric power with utilization of cooling systems. The disclosed enthalpy and internal-energy difference (E.I.D.) energy conversion method is basically a cooling method capable of generating power. It creates a condition in an energy conversion cycle that enables absorption of heat and generation of electric power based on the difference between enthalpy and internal energy of a fluid or fluids. The power it generates can then also be used by other components in the system. The proposed system and method can be categorized into open and closed cycles. For instance, the systems employing open cycles can use air as the working fluid, while in closed cycles, the working fluid is selected with respect to the conditions. The present disclosure teaches at least four proposed methods that are different in terms of their level of dependency on the cooling system as well as their implementation costs.

During the conversion process, fresh drinking water can be produced through absorption of heat from air or water vapor. Moreover, harmful gasses such as methane, NOx, monoxide carbine and carbon dioxide can be condensed and absorbed from the air. The extra power during non-peak hours can be used for water electrolysis to achieve hydrogen to be used as fuel and also to produce desalinated water. Moreover, since the temperature of any external fluids such as air and hydrogen could be highly decreased for liquefaction due to heat absorption from them without consumption of electrical power, both fluids can be used to generate power and run engines.

While the cycles in the disclosed system and methods are not complex to implement, use of cost/energy efficient cooling systems are recommended so that the power generated through the proposed system methods is greater than the power consumed by the cooling system. For instance, although the E.I.D. cooling method can generate power from any fluid at roughly any temperature, it requires cylinders with high heat transfer efficiencies. Therefore, to use this method as the cooling system, its costs and limitations should be taken into consideration. Fortunately, today's heat exchangers have a considerably high efficiency (up to 99 percent in some currently available types).

These and other features, aspects and advantages of the present invention will become better understood with reference to the following drawings, description and claims.

BRIEF DESCRIPTION OF THE DRAWINGS

FIG. 4A and FIG. 4B are schematic diagrams according to an exemplary embodiment of the present disclosure showing power generation procedure.

DETAILED DESCRIPTION OF THE PREFERRED EMBODIMENT(S) AND DISCLOSURE

Figure 1:
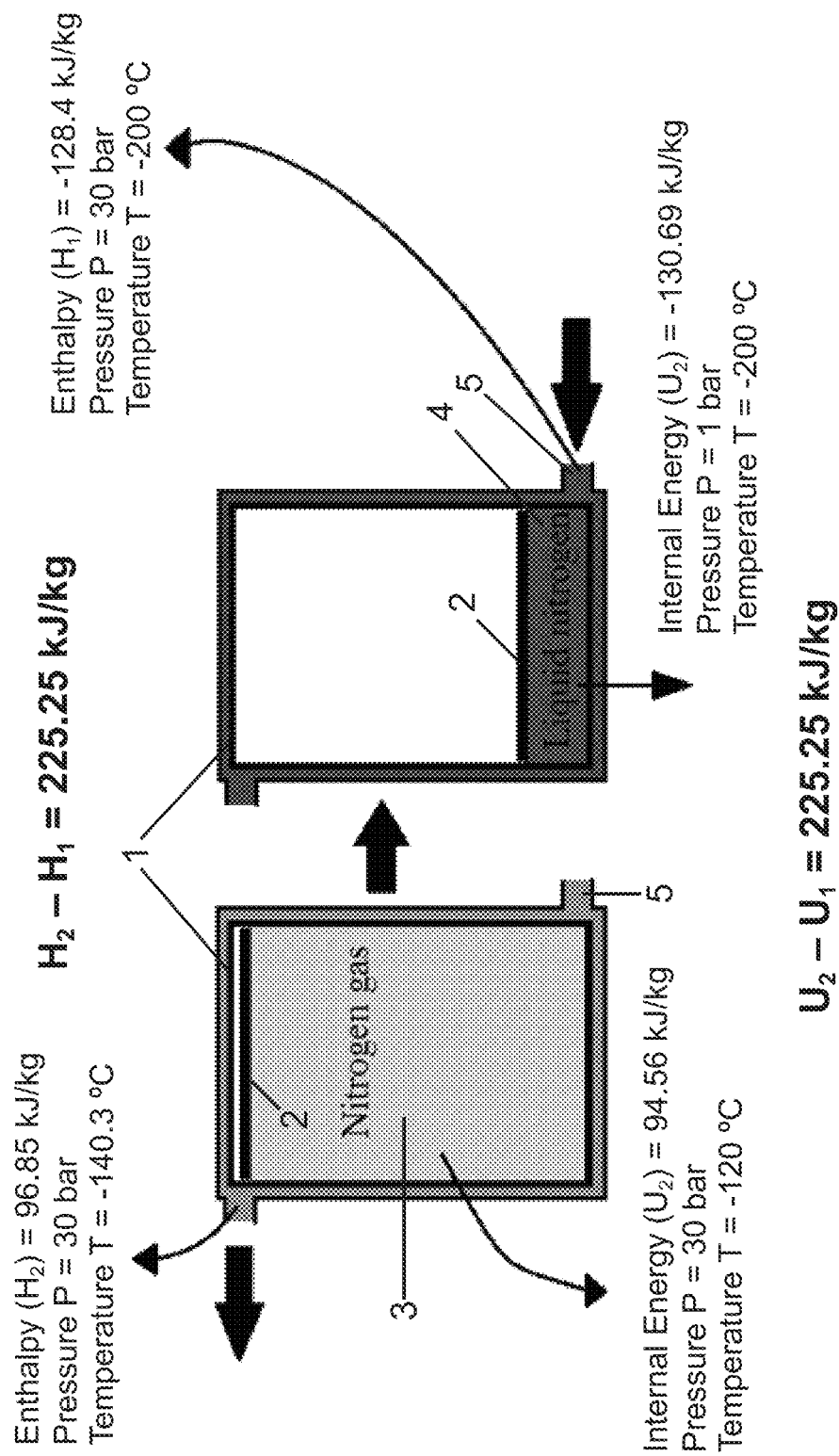
FIG. 1 is a schematic diagram according to an exemplary embodiment of the present disclosure showing single-phase E.I.D. power generation method with a conventional cooling system.

The following description is not to be taken in a limiting sense, but is made merely for the purpose of illustrating the general principles of the disclosure, since the scope of the disclosure is best defined by the following claims. Various inventive features are described below that can each be used independently of one another or in combination with other features.

For purpose of present disclosure, the term "fluid" refers to a substance, as a liquid or gas, that is capable of flowing and that changes its shape at a steady rate when acted upon by a force tending to change its shape. Thus, the term fluid may be interchangeable or replaced with "gas" or "liquid" depending on the context. Also, the term "EID" or "E.I.D." is an abbreviation for "Enthalpy and Internal-energy Difference", where the term is also used to refer to an energy conversation. Thus, for purpose of the present disclosure, the term "EID" or "E.I.D." may also mean Enthalpy and Internal-energy Difference Energy Conversion depending on the context. For example, the disclosed E.I.D. system creates a lack of energy so that for compensating the lack of energy of the system, energy must be absorbed from an external fluid with higher temperature to balance the system.

Broadly, embodiments of the present disclosure generally relate to methods and systems for converting heat to electrical power. In one embodiment, the present disclosure discloses a cooling cycle which generates electrical power while absorbing energy from any fluid at roughly any temperature. In this method, the energy of the fluid is absorbed and converted to electricity, causing the fluid to cool down or even condense. The disclosed system and method are based on the difference between the enthalpy and internal energy of fluids. Few notes and examples are presented below for a better understanding.

An explanation for thermodynamic property of the fluid can help to further elaborate the matter as follows. Assume a certain amount of thermal energy is given to a fluid in two different states where it is subjected to a constant pressure or it is forced to have a constant volume (aka isobaric and isochoric conditions). In both cases the result would be increase of temperature in the fluid. However, the fluid with the constant pressure would have lower temperature compared to the fluid with constant volume due to the produced work during the process. In other words, by heating a fluid under isobaric and isochoric conditions with the same amount of energy, the temperature of the fluid under both conditions consequently rises. However, in the isobaric condition, the final temperature is lower than that of the isochoric condition, and the reason for which is attributed to the produced work in the isobaric condition.

Therefore, independent of the working fluid, $C_p$ always has larger values than $C_v$ (i.e., $C_p=C_v+R$, where R is gas constant), or in other words, the enthalpy H is greater than the internal energy E (i.e., $H=E+PV$, where P is pressure and V is volume). Due to their higher compressibility, gasses demonstrate this effect more evidently. In order to better explain the disclosed method and system, it is assumed that each cycle is ideal and no heat loss occurs during the process. Also, for purpose of illustration, embodiments below will use nitrogen gas and liquid nitrogen to show how the disclosed method and system work. However, the nitrogen gas and the liquid nitrogen can be interchanged or replaced with other types of fluids (in their gas and/or liquid forms).

FIG. 1 shows the basics of electrical power generation according to one embodiment of the present disclosure. Here, nitrogen gas 3 is injected into cylinder 1, and is converted into liquid nitrogen 4. Assuming that during this conversion process, an external fluid 5 (assuming also nitrogen) cools the nitrogen gas 3 down by absorbing its energy, as a result of which the atmosphere (i.e., change in pressure) causes the piston 2 to move down. In this example, the energy difference for the gas contained within the cylinder is 225.25 kJ/kg (e.g., $H_2-H_1=96.85--128.4=225.25$ kJ/kg). Note the source of external fluid 5 can be the same as nitrogen gas 3 and liquid nitrogen 4, this will be demonstrated by a single-phase power generation system shown in FIG. 2.

Now, in the case this amount of energy is absorbed by the external fluid 5 (e.g., liquid nitrogen) outside of the cylinder 1 in a pressure of 30 bar and at a temperature of −200° C., the external fluid 5 (e.g., liquid nitrogen) is then converted to gas (e.g., nitrogen gas), reaching a temperature of −140.3° C., which is still lower than −120° C., the temperature of nitrogen gas 3 inside the cylinder 1.

Then, the gas (e.g., nitrogen gas) converted from the external fluid 5 is heated by the air in the room to increase its temperature from −140.3° C. to −120° C. By injecting the nitrogen gas 3 into the cylinder 1, a pressure of 30 bar can be obtained again. This can be done using a pump, which consumes electrical power to complete the cycle. In fact, the temperature difference in an isobaric case is compensated by transferring energy from the environment to the fluid under isobaric conditions, in addition to energy received from the system. The required energy to pump the fluid is considerably less than the energy received from the piston. In fact, given that $h=u+pv$, the energy received from piston is equal to pv, and the internal energy u is stored in the cylinder 1 without changes in order to transfer its energy to the compressed fluid.

The mentioned heat transfer process cannot be fully carried out merely by one cylinder, since the gas contained within the cylinder does not fully cool down and the external fluid cannot fully absorb the energy within the cylinder, as a result of which, the cycle will not be balanced. However, in the case where there are sufficient number of cylinders and adequate heat transfer rate to further facilitate the heat transfer between the external fluid and the fluid inside the cylinder, the cycle will be balanced, helping the fluid inside the cylinder to fully cool down and reach the input temperature of the external fluid. In addition, the cycle should be designed in a way such that $\Delta u \leq \Delta h$, i.e. the variations in specific enthalpy of the compressed fluid must be larger than variations in specific internal energy of the fluid contained within the cylinders under constant-volume conditions, where injection of heat to the cycle should be necessary to compensate the lack of energy due to work received from the cycle, which is considered the most principal method of power generation. For examples, to design the cycle, the fluid with constant pressure can be expanded after its injection into the cylinder (the expansion ratio can be obtained through thermodynamic calculations) or it can be expanded using a turbine and then injected into the cylinder.

Embodiments below shows at least four different methods of electricity generation by conversion of thermal energy according to the present disclosure, two of which are closed-cycle methods while the other two are open-cycle methods. All methods utilize the same type of cooling system. The disclosed E.I.D. technique can also be employed by these methods as their cooling systems. All four proposed methods assume that the cooling system consumes zero or a negligible amount of energy compared to the generated electricity. Since the E.I.D. is a cooling method capable of generating electricity, this method can be used for cooling purposes.

The thermal energy required for the cycles can be supplied through both fossil and renewable energies. However, effort is made to use renewable energy sources such as air and seawater.

In the proposed electricity generation methods, the working fluid is fully liquefied by the cooling system. Then, the fluid passes through a turbine to generate electricity after its energy level is increased through an external fluid with higher temperature.

Figure 2:
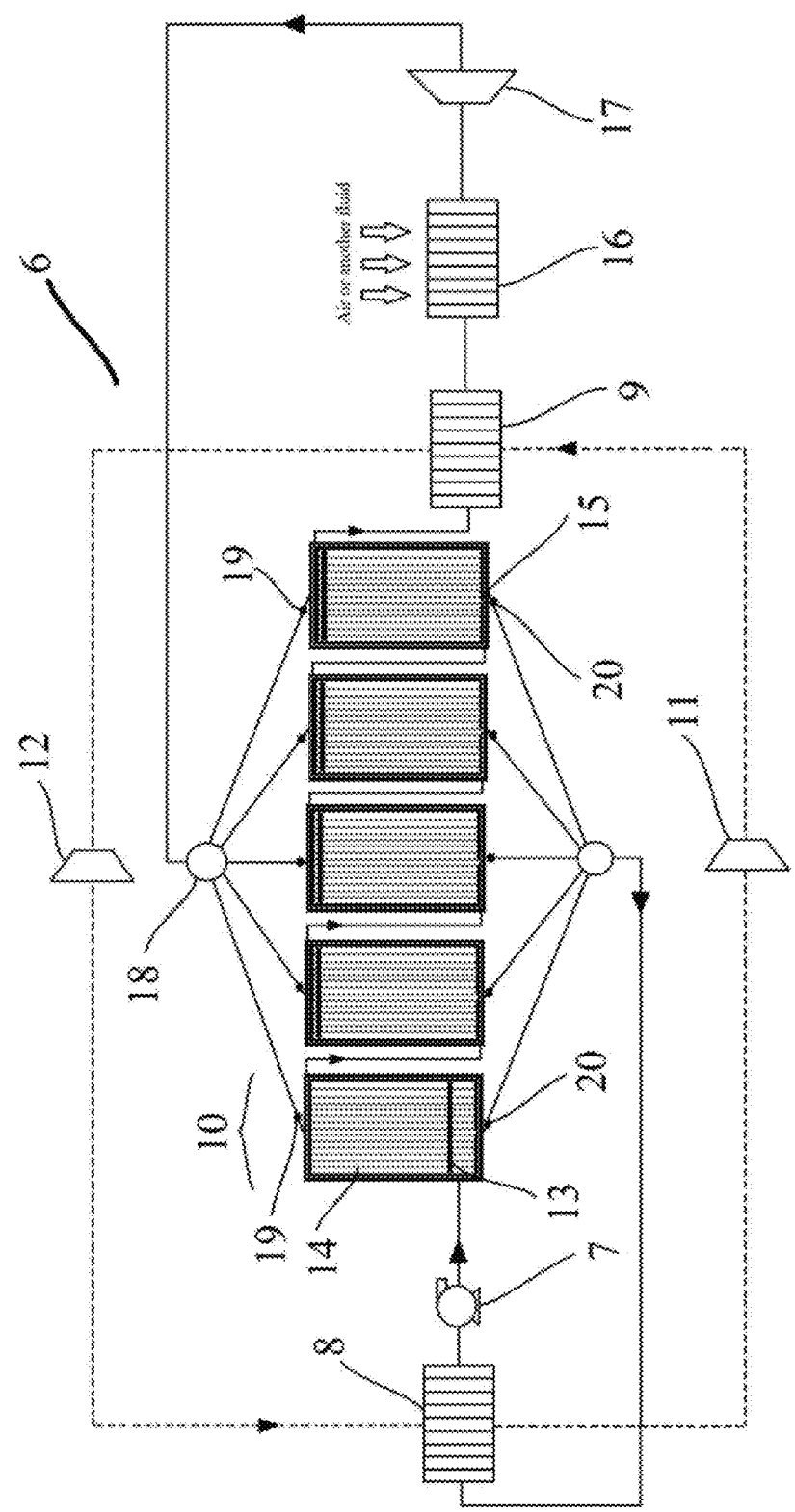
FIG. 2 is a schematic diagram according to an exemplary embodiment of the present disclosure showing a proposed single-phase power generation method using a cooling system.

FIG. 2 is a schematic diagram of a single-phase E.I.D. power generation system/method 6 utilizing a conventional cooling system according to an exemplary embodiment of the present disclosure. Here, the disclosed power generation system 6 comprises a pump 7, a first heat exchanger 8, a second heat exchanger 9, a plurality of cylinders 10, a plurality of reciprocating pistons 13, a plurality of input flow rate control valves 19, a plurality of output flow control valves 20; a compressor 11, a first turbine 12, a pipe 14, a third heat exchanger 16, a direction control valve 18, and optionally a stirring system 15 and/or a second turbine 17.

The pump 7 is responsible for compressing a first fluid (the path of the first fluid is denoted by solid line). The first fluid can also be referred to as the "working fluid." The first heat exchanger 8 uses a second fluid (the path of the second fluid is denoted by broken line) to fix the temperature of the compressed first fluid, where the first heat exchanger 8 can be installed after the pump 7 depending on the cycle conditions. The second heat exchanger 9 allows the energy to be transferred between the first fluid passing through and exiting the plurality of cylinders 10 and the second fluid from output of the compressor 11. Each of the plurality of cylinders 10 comprises a reciprocating piston (i.e., one of the plurality of pistons 13), an input flow rate control valve (i.e., one of the plurality of input flow rate control valves 19) and an output flow control valve (i.e., one of the plurality of output flow rate control valves 20). The plurality of reciprocating pistons 13 are responsible for transferring the force produced to a hydraulic system for power generation (e.g., force produced during injection of gas into the plurality of cylinders 10 or conversion of liquid and gas in the plurality of cylinders 10). Details of the power generation will be discussed below and illustrated by FIG. 3. The input flow rate control valves 19 controls the input flow rate for the plurality of cylinders 10, and the output flow control valves 20 controls the output flow rate for the plurality of cylinders 10.

The conventional cooling cycle, which is demonstrated by dotted lines, can be represented by a combination of the compressor 11 and the first turbine 12. The compressor 11 compresses the gas (e.g., gas form of the second fluid) between the first heat exchanger 8 and the second heat exchanger 9, where fluid produced after compression (e.g., after the compressor 11) is cooled down by second heat exchanger 9 or other fluid(s). Thus, the first heat exchanger 8 before the pump 7 is responsible for keeping the cycle cool, and the second heat exchanger 9 is responsible for transferring the heat generated by compressing the second fluid in this cycle. Therefore, the temperature of the fluid of the main cycle can be controlled by the turbine 12 by decreasing the pressure and temperature of the fluid. It should be noted that cooling of the cycle can be carried out by any external fluid of lower temperature. Further, compressor 11 may consist of several compressors with intercooling and uses second heat exchanger 9 to decrease energy consumption. Conversely, the first turbine 12 expands a cooled gas and reduces its temperature, and transfer it to heat exchanger 8 to maintain the low temperature of the compressed first fluid from pump 7. The pipe 14 is configured in a way that is in contact with the casing of the plurality of cylinders 10 allowing the compressed first fluid to pass through and contact casings of the plurality of cylinders 10, and to absorb the energy of the fluid (also the first fluid) that is contained within the plurality of cylinders 10 to cause its expansion, where this procedure is carried out after passing through plurality of cylinders 10. Preferably, the compressed first fluid must pass through and contact the plurality of cylinders' 10 casing to enable full energy absorption. The optional stirring system 15 can be implemented within each of the plurality of cylinders 10 to facilitate heat transfer.

The third heat exchanger 16 is responsible for absorbing energy from any external fluid (air or another fluid) to increase energy of the first fluid (before entering turbine or injecting within cylinder). In other words, the third heat exchanger 16 is used to allow the first fluid to absorb energy from another fluid such as air or sea water, thereby generating power from air or sea water. The optional second turbine 17 can be installed after the third heat exchanger 16 and is configured to activate when the cycle works in a balanced condition in which cooling of the fluid within cylinders is easily carried out, consequently causing a decrease in the consumed energy by the cycle to increase the electrical power generated. Note utilizing turbine needs specific calculation such as pressure ratio, input and output temperature to maintain the cool state of the compressed fluid, otherwise when the ratio of generated power to consumed power is low or the cycle is not balanced, the turbine should be removed. Expansion of the first fluid during injection to cylinder could happen in a predicted and limited expansion ratio, so the optional second turbine 17 can be removed under such scenario.

The flow rate and direction control valve 18 regulates the flow, injection and removal of the first fluid from the cylinder. The plurality of input flow rate control valves 19 control the input flow rate for the plurality of cylinders 10 and the plurality of output flow control valves 20 control the output flow rate for the plurality of cylinders 10.

In this embodiment, the external fluid (referring to the first fluid that contacts casings of cylinders 10), which is the same type as the internal fluid (referring to the first fluid that is injected into and contained in the cylinders 10), is initially compressed by the pump 7 and is then cooled down using another cycle (i.e., by first heat exchanger 8). Then, as the external fluid is transferred from one cylinder to another by passing through the pipes 14, its temperature increased, causing it to expand. As a result, the cylinders 10 (or the internal fluid) are cooled down in turn until all of them reach the same temperature as the external (or passing) fluid. After heating (or absorbing energy), the external fluid enters two heat exchangers (i.e., the second heat exchanger 9 and the third heat exchanger 16). The second heat exchanger 9 is responsible for maintaining the cool state of the external fluid, and the third heat exchanger 16 is to increase temperature of the external fluid, which may be carried out through air or any other fluid(s). In the next stage, the external fluid enters a turbine 17 and generates power. Then, as the external fluid is injected into the cylinders 10 and becoming internal fluid, the pistons within the cylinders 10 are moved to generate additional power through another mechanism. To prevent or reduce heat loss, additional insulation system can be installed on the plurality of cylinders 10.

Figure 3:
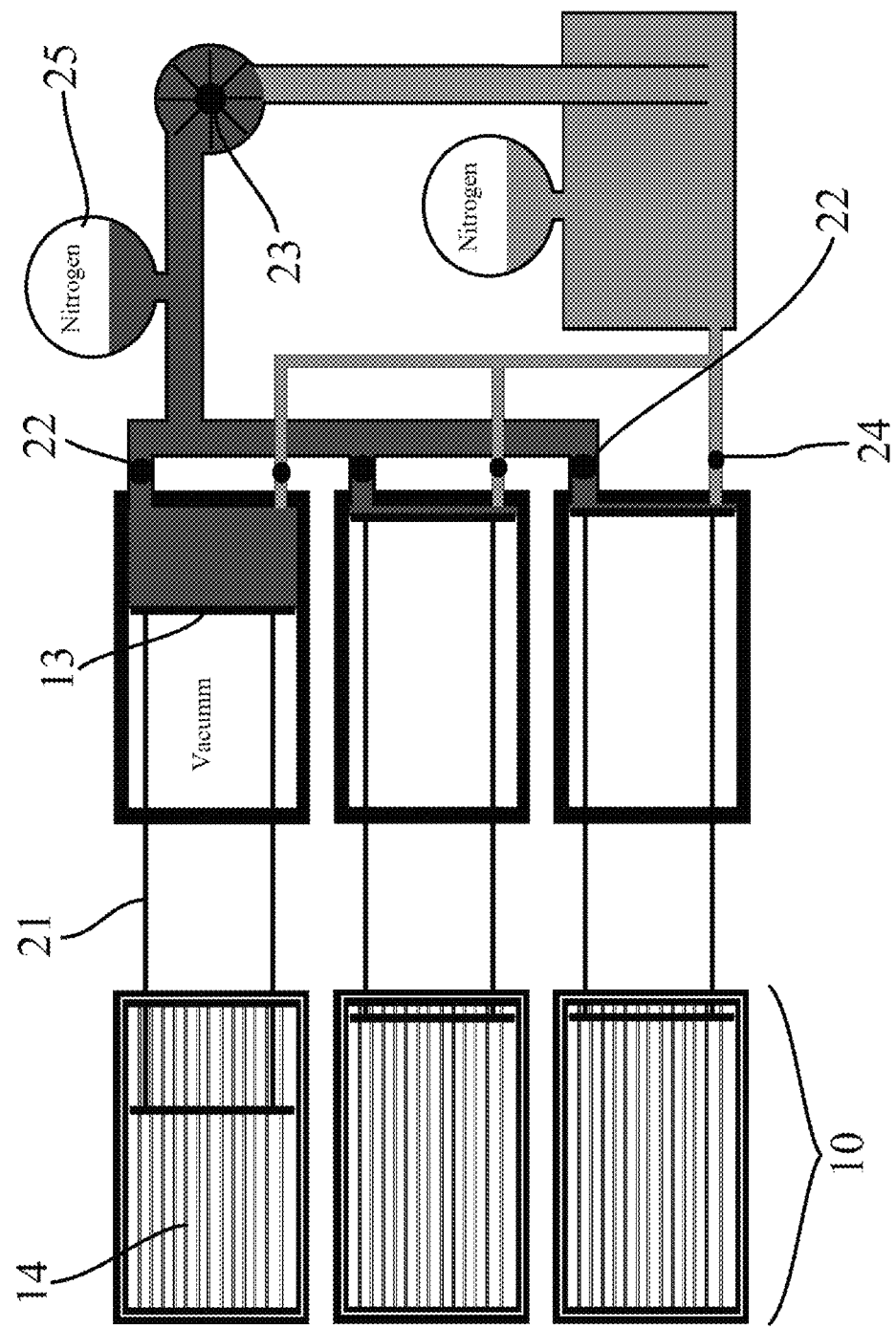
FIG. 3 is a schematic diagram according to an exemplary embodiment of the present disclosure showing the mechanism of force transmission to the hydraulic turbine.

FIG. 3 demonstrates a mechanism of force transmission from cylinders 10 to a hydraulic system according to one embodiment of the present disclosure. Here, the disclosed hydraulic system also has multiple cylinders and pistons, where pistons of the hydraulic system are connected to pistons 13 of the disclosed system through columns 21. The cylinders and pistons designed for the hydraulic system are considerably smaller than the those in the cycle. For each cylinder of the hydraulic system, there is also a valve 22 that controls the direction of the high-pressure flow, and a valve 24 that controls the direction of low-pressure flow. The mechanism further comprises a hydraulic turbine 23, and an accumulator 25 for preventing impact pressure as well as maintaining the pressure.

Since the contact between the cylinders' 10 components and fluids of high temperature difference can cause negative effects on both the power output and the equipment due to thermal shocks, the disclosed hydraulic system uses additional pistons and cylinders for force transmission, where the force is initially transferred to a fluid (e.g., water or oil), and power is generated when the fluid passes through the hydraulic turbine 23. The pressure of the air or the accumulator 25 causes the fluid to be injected into the cylinders of the hydraulic system, and during the procedure of which low-pressure valve 24 is closed, causing the fluid to enter the turbine 23 and consequently generate power. In addition, to prevent or reduce impact to the turbine 23, accumulator 25 can be used to change the operating pressure of the returning fluid. A smart hydraulic fluid control system can also be utilized to eliminate the pistons and cylinders by controlling the intake and exhaust of the hydraulic fluid into the main cylinders of the cycle shown in FIG. 2. One way to achieve this is to control and make the hydraulic fluid and the internal body of the main cylinders to be at the same temperature. Additionally, the entry and exit time of the hydraulic fluid from the cylinders can be controlled for this purpose as well.

Two important points should be noted regarding the power generation cycle in the system shown by FIG. 2. First, use of the optional second turbine 17 is not always practical as it may cause instability of the cycle, and change the temperature or form of the output fluid from the coldest cylinder which is required to be condensed and at an appropriate temperature. In practice, the more the energy received from the piston and turbine, the more the energy required to cool down the pumped fluid. Second, in this power generation system, the external cooling cycle is created by a conventional cooling system (i.e., heat exchangers 8 and 9, compressor 11 and turbine 12) to maintain the first fluid's temperature before compressing by pump 7.

Figure 5:
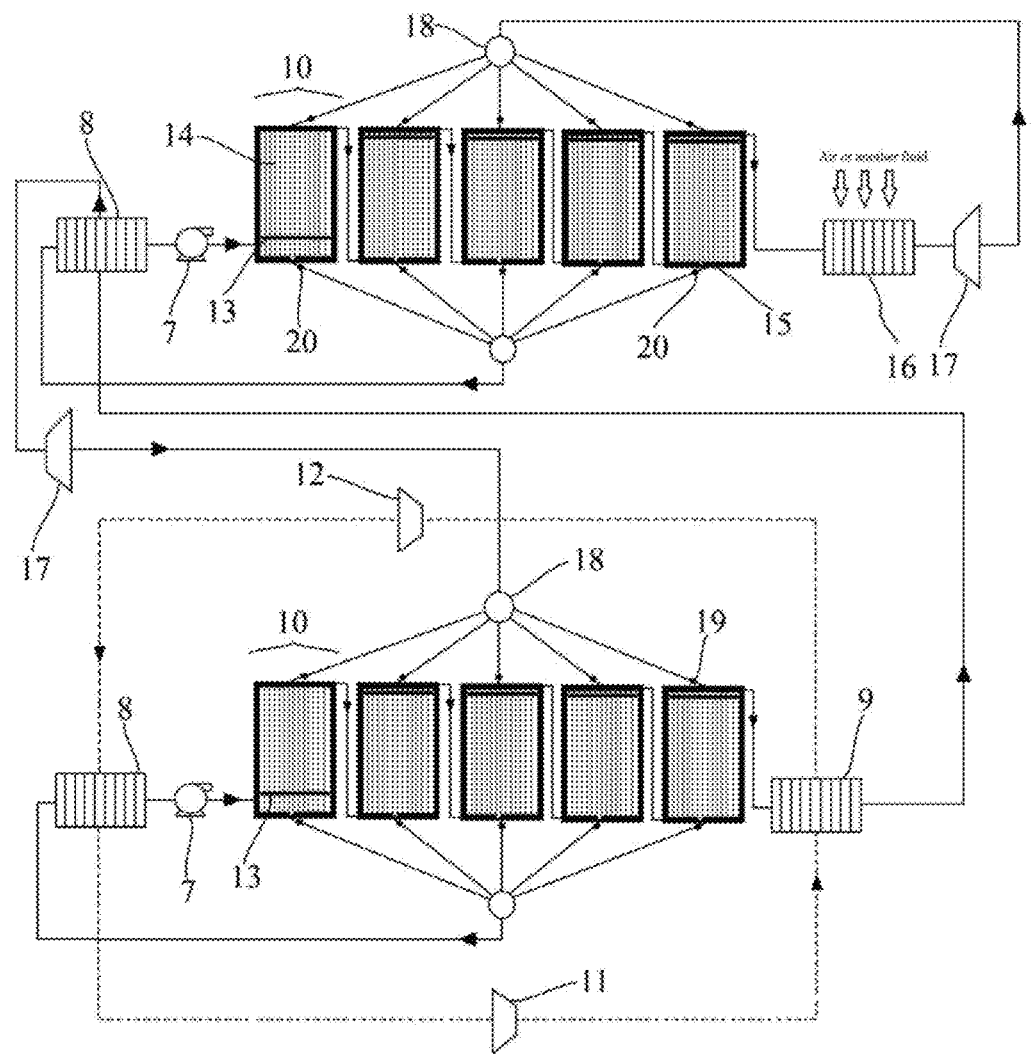
FIG. 5 is a schematic diagram according to an exemplary embodiment of the present disclosure showing a dual-stage power generation cycle accompanied by a single-stage conventional cooling system.

However, this conventional cooling cycle can be eliminated by replacing it with the disclosed system/method along with one or more cycles operating on a fluid with a lower liquefaction temperature. For example, instead of using a conventional cooling system, the disclosed system can employ one or more cycles with a working fluid of lower condensation temperature. Moreover, for the last cycle, any conventional cooling method can be used, in case of which, the new cycle receives its energy from the heat exchanger 8 and the second heat exchanger 9, and the turbine 12 and the compressor 11 of the conventional cooling system are removed from the disclosed system as shown by FIG. 5.

The use of conventional cooling cycle is recommended in the disclosed power generation cycle when no external fluid is accessible for cooling the cycle. However, when there is accessible fluid with a lower temperature, the fluid should be used to cool the power generation cycle instead and eliminate the conventional cooling cycle. For instance, in case the conventional cooling system uses a compressor with a high-pressure ratio, which increases the fluid temperature higher than that of the environment, air can be used to cool down the fluid. In another example, the first cycle can employ carbon dioxide as the coolant, for cooling of which another cycle with a working fluid of lower condensation temperature such as methane can be used. Applying the same procedure, next conventional cooling cycles can utilize fluids such as nitrogen, hydrogen, and ultimately helium. In addition, seawater, air, etc. can be used to cool the power generation cycle in case the heat source has a considerably higher temperature compared to the environment and its exhaust cooled working fluid has a temperature higher than the environment. On the other hand, in the methods disclosed by the present disclosure, the turbines are also capable of cooling.

While cylinders 10 are cooled along with their confined fluids by the compressed working fluid, the cylinders could be warmed up for injection of the working fluid warmed up by the exchangers in advance to provide better result. In other words, the cylinders should be warmed up before injection of the hot fluid. This is possible using the flow and directional control valves 19, 18, and 20 by passing a portion of the exhaust flow from the exchanger of turbine 17 or heat exchangers 9 and/or 16 through the pipes of the empty cylinders and around them instead of full injection of the fluid into the cylinders. Therefore, the empty cylinders are warmed up and the passing fluid is cooled down. This increases the lifetime of the parts, prevents thermal shock, and increases the thermal efficiency of the cycle.

As mentioned before, employing turbine 17 to expand the working fluid is optional; a cylinder and piston with a given pressure ratio can be utilized instead. Moreover, turbine 17 can be used in multi-stage cycles (FIG. 5). Generally, utilizing this turbine positively affects the thermal efficiency and facilitates control of the cycle.

For a more comprehensive understanding of the present disclosure, more explanations are provided below. As stated before, the objective of the present disclosure is to generate electrical power from air or any other fluid of any temperature, including those below zero ° C.

As shown by FIG. 2, cylinders 10 are used in the power generation cycles so that the returned fluid from the turbine (i.e., the second turbine 17) undergoes an isochoric process to generate power, such that the fluid can more easily be converted to liquid by compressed fluid and through pump 7. In other words, the cycle is to be designed such that $\Delta u \leq \Delta h$, i.e. the variations in the enthalpy of the compressed fluid are larger than changes in internal energy of the contained fluid within the cylinder under constant-volume conditions, which is considered the most principal method of power generation.

FIGS. 4A and 4B are schematic views showing exemplary power generation procedures for the system disclosed in FIG. 2. The following relation was used to calculate the variations in the energy of the compressed fluid contained within the cylinders 10:

$$\dot{Q} - \dot{W}_S = \dot{m}_2 u_2 - \dot{m}_1 u_1 + \dot{m}_{out}(h + V^2/2 + gz)_{out} - \dot{m}_{in}(h + V^2/2 + gz)_{in}$$

It is important to note that in the disclosed system and method, all the components are required to be pre-calculated so that the cycle can generate power and maintain its stable operation. Hence, in order to have an economic and feasible cycle, many parameters such as the level of heat transfer by the cylinders to the fluid, minimum and maximum operating temperatures of the cycle, presence or absence of a turbine, turbine compression ratio, pump compression ratio used in compression of the fluid, and sizes of cylinders are of great importance. In order to analyze the method using Aspen HYSYS® software (i.e., a dynamic process simulation software), the heat transfer efficiency of the cylinders for a 100% was initially investigated, then the effect of efficiency drop was studied. The effects of the employed insulator and metals were considered negligible. The analysis was considered in a steady state so that results could not be affected by time.

As shown by FIG. 2, after absorbing energy from cylinders, the fluid leaving the pipe 14 was heated by the exiting hot fluid from the compressor 11 (i.e., the conventional cooling system) and the air in the environment (e.g., the third heat exchanger 16).

To carry out the manual calculations, the present disclosure utilizes Thermo-Physical Properties of Fluid Systems retrieved from NIST Chemistry WebBook, where the thermodynamic tables for all fluids are presented.

Table 1 below provides the technical data (i.e., cycle conditions) for the embodiment illustrated by FIG. 4A.

TABLE 1

| | |
|---|---|
| Working fluid: | Nitrogen |
| Conventional cooling system working fluid: | Hydrogen |
| Pump efficiency: | 95% |
| Power consumption: | −4.2 kW |
| Turbine efficiency: | 95% |
| Power output: | 71 kW |
| Power generation from piston by injecting 10 bar output gas from turbine: | 37.8 kW |
| Flow rate: | 1 kg/s nitrogen |

Note:
Cooling system power consumption for reducing temperature of liquid nitrogen about 1° C., assumed to be negligible.

Here, in case the entire energy of the cylinders is absorbed, the temperature of the compressed fluid increases from −200° C. to −109° C., finally reaching 0° C. as it is heated by the air. In fact, an amount of 128 kJ/kg is absorbed from the air. The cycle offers a thermal efficiency of 81% by generating roughly 105 kW of electrical power.

Assuming there is a thermal loss of eleven percent (11%) in the system as illustrated by FIG. 4B. At a 100 percent efficiency, the variation in the internal energy of the contained gas within the cylinders was 276.2 kJ/kg, meaning that cylinder (1) contains some uncondensed gas. In order for the cycle to achieve a steady-state cycle, the remaining gas is to be condensed and then pumped to reach temperatures of −201° C. and −200° C., respectively. Table 2 below provides the technical data for the cycle conditions:

TABLE 2

| | |
|---|---|
| Working fluid: | Nitrogen |
| Conventional cooling system working fluid: | Hydrogen |
| Pump efficiency: | 95% |
| Power consumption: | −4.2 kW |
| Turbine efficiency: | 95% |
| Pressure ratio: | 30/10 bar |
| Power output: | 71 kW |
| Power generation from piston by injecting 10 bar output gas from turbine: | 37.8 kW |
| Turbine and compressor efficiency for conventional cooling system: | 95% |
| Pressure ratio of compressor: | 1/80 bar |
| Power consumption: | −193 kW |
| Pressure ratio of turbine: | 80/1 bar |
| Power production: | 83 kW |
| Flow rate: | 200 kg/hr or 0.05555 kg/s Hydrogen |
| RESULT | |
| Power production: | 191.8 kW |
| Power consumption: | 197.2 kW |
| Overall power generation: | −5.4 kW |

Note:
A conventional cooling system is demonstrated in FIG. 2 as well as compressor 11 and turbine 12.

As Table 2 shows, no electrical power is practically generated in this cycle, and instead, power is consumed. Consequently, the following three methods can be used to generate electrical power and increase thermal efficiency:

1. Employing multistage compressors and inter-cooling to reduce power consumption of the cycle.
2. Manufacturing cylinders with higher heat transfer capabilities to increase thermal efficiency and provide better insulation.
3. Employing a fluid with a lower operating point temperature compared to nitrogen, e.g. hydrogen, in the proposed cycle, so that in the second cycle, heat is absorbed from the exiting nitrogen from cylinder 1.

Cooling of the hydrogen cycle should be carried out at a temperature of roughly −250° C.

Generally, in case a single-stage cycle is used, the heat transfer efficiency should be higher than 90 percent so that power can be generated. On the other hand, in the case of a low efficiency, the amount of output water by the cycle exceeds its generated power.

The following results were obtained for a single-stage power generation cycle with a heat transfer efficiency of 100 percent: For nitrogen with a flow rate of 1 kg/s, roughly 105 kW of electrical power as well as 75 kg/hr water can be generated from air, assuming 7 g of water per cubic meter of air, i.e. a relative humidity of 30%. In case fossil fuels such as natural gas are used instead of air as the heat source, the present cycle is capable of achieving more electrical power than current 63 percent record.

On the other hand, there are specific difficulties involved in this method, especially in utilizing piston-cylinder which further increases maintenance costs. Employing this cycle to generate power from air or sea water can be advantageous compared to the existing power generation methods with their specific problems.

During the conversion process, drinking water can be produced through absorption of heat from air or water vapor. For example, drinking water can be produced by condensing the humidity in air by passing the air from the third heat exchanger 16, or condensing steam water at a pressure of 1-5 kPa or higher pressure by passing through the third heat exchanger 16. Moreover, harmful gasses such as methane, NOx, monoxide carbine and carbon dioxide can be condensed and absorbed from the air. Extra electricity during non-peak load can also be used to desalination of water or electrolysis of water to achieve hydrogen and oxygen. In brief, the third heat exchanger 16 performs cooling that leads to condense or reducing temperature of fluids or devices. If the third heat exchanger 16 absorbed heat from air, it could purify air by condensing harmful gases or overall gas liquefaction.

FIG. 5 illustrates a dual-stage power generation cycle accompanied by a single-stage conventional cooling system accordingly to another embodiment of the present disclosure. Here, the conventional cooling system (compressor 11 and turbine 12) used by the disclosed system in FIG. 2 is replaced by the same invented concept to absorb heat from first cycle to fix the temperature of first fluid before the pump using dual-stage or multipole-stage of the concept. All components are similar, but their working fluids are different. The compressed fluid of the lower cycle absorbs the required energy for expansion from the upper cycle, which works in a higher operating temperature. The increased number of repeated cycles increases the overall efficiency of the cycles, since there are no compressors, which consume electrical power, are used in the upper conventional cooling system, as demonstrated.

Here, it is worth mentioning that the heat transfer efficiency is highly dependent on the working fluid compressed by pumps 7, the working fluid confined in cylinders 10, and cylinder insulation in preventing repetition of cycles. The thermal efficiency of heat exchangers 8, 9 and 16, on the other hands, have lower significance.

In one embodiment, cylinders 10 are equipped with a stirring system 15 for the confined fluid, where natural heat transfer is turned into forced heat transfer to increase the heat transfer rate while using a smaller evaporation surface.

The invention includes a two-stage cycle which can operate both on a single fluid type or several different fluids. For instance, R22 can be used as the coolant in first proposed cycle. In order to cool this cycle, the next cycle can employ a fluid with a lower liquefaction temperature such as methane. The same procedure can be applied to the next cycles using fluids such as nitrogen and hydrogen. Ultimately, helium can be used for the conventional cooling system (FIG. 5).

The multi-stage method and conventional cooling can be used if the objective is to reach considerably low temperatures. All components in FIG. 5 are similar and the two cycles operate on either a similar fluid or two different fluids. The compressed fluid in the lower cycle absorbs the energy for expansion from the upper cycle which operates at a higher temperature. More repeating cycles increase the overall thermal efficiency of the cycles, since the upper cycle does not employ any conventional cooling systems with turbines or compressors to consume power. Similar to FIG. 2, turbine 17 can be employed in the cycles of FIG. 5 by taking the technical calculations into consideration to increase efficiency.

A single-stage cycle with a conventional cooling system can be used in case heat is absorbed from the environmental air, and the thermal efficiency and operation at considerably low temperatures are not a matter of concern (FIG. 2).

The surrounding air or water can be utilized for cooling purposes using a conventional cooling cycle and by considerably increasing the compression ratio of compressor 11. Evidently, the effect of the conventional cooling cycle is decreased by employing high-efficiency cylinders.

The most important fundamental of the proposed power generation method is determining the pressure ratios for different components and devices which play key roles in the cycle, namely, cylinders, pumps, and turbines. They must be designed so that the change in the specific enthalpy of the fluid compressed by the pump is greater than that of the specific internal energy of the fluid confined in the cylinder under constant-volume conditions, i.e. $\Delta u \leq \Delta h$. This means that the compressed fluid should be capable of absorbing the entire energy of the fluid confined in the cylinders (from the beginning to the end of its passage from the cylinders). Therefore, the pressure ratios of the pump and the turbine should be within an appropriate range since excessive pressure in the pump not only increases power consumption, but also prevents evaporation of the compressed fluid.

In order to increase the thermal efficiency of the cycle, multiple turbines 17 can be utilized to allow more and consistent energy absorption by the heat exchanger. In this case, the generated power by turbines 17 is increased.

In order to decrease the power consumed by the conventional cooling cycle, multiple compressors 11, which are cooled by the second heat exchanger 9, can be utilized.

In the case of breakdown of a cylinder or its components, the working fluid can be extracted through the control valves 18 so that the part could be fixed. The fluid can then be restored to the cycle. The repairing process should better be carried out at room temperature.

Figure 6:
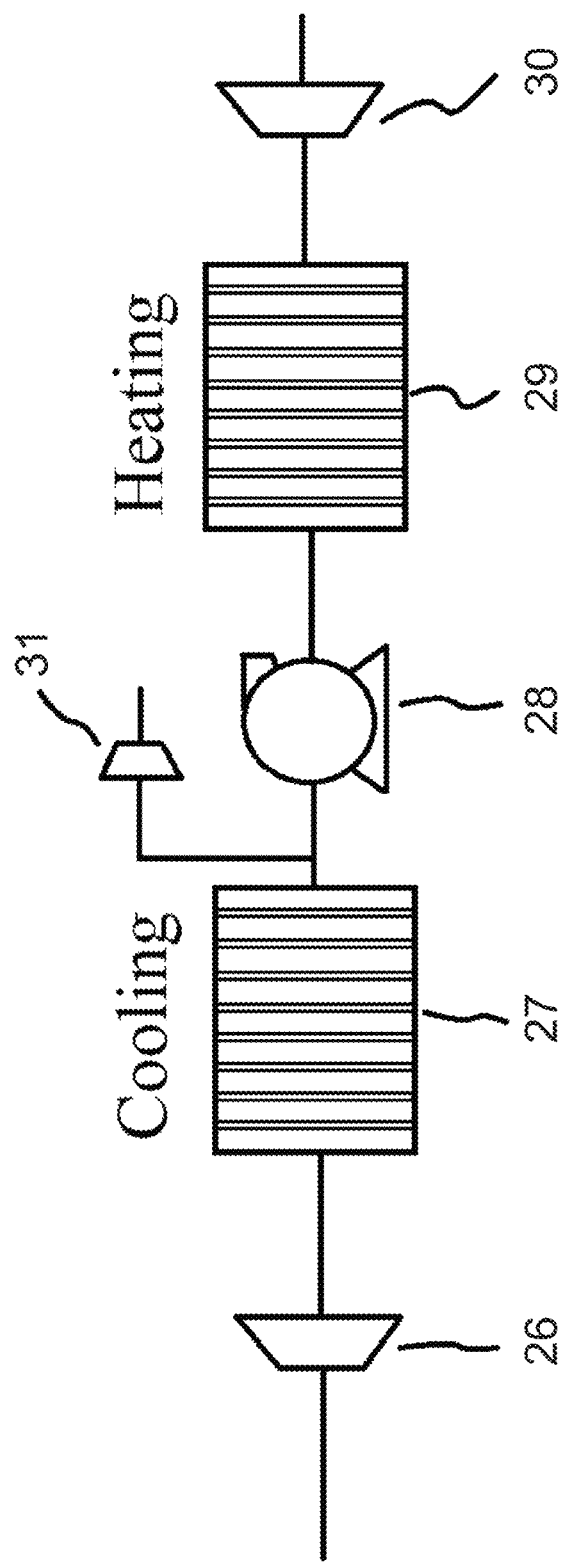
FIG. 6 is a schematic diagram according to an exemplary embodiment of the present disclosure showing the disclosed power generation system using E.I.D. cooling method under open cycle.

FIG. 6 is a schematic diagram according to an exemplary embodiment of the present disclosure showing the disclosed power generation system using E.I.D. cooling method under open cycle (hereafter "first method"). In the first method, after passing through turbine 26 and decreasing its pressure, the working fluid in its gaseous state enters a first heat exchanger 27, where its energy is absorbed. In other words, the working fluid is cooled down and converted into its liquid phase. In the next stage, the working fluid is compressed by a pump 28 and enters a second heat exchanger 29 to be heated by the external fluid and converted to the gaseous sate. In the last stage, the working fluid enters turbine 30 and generates power. Note that in case the working fluid contains a mixture of gases, those which are not liquefied are removed from the cycle by compressor 31. Moreover, second heat exchanger 29 and turbine 30 can be repeated to allow the former to act as an intermediate heater between the turbines.

There are various ways for turbine 30 to generate power. In one embodiment, the turbine 30 is simply connected to a gearbox and a rotary generator, where power is generated through turbine 30's rotational motion. Since power generation with rotational motion has been a well-known technology to people skilled in the art, any such known means for generating power shall be construed as part of the present disclosure. Thus, for purpose of the present disclosure, all turbines mentioned in the disclosed E.I.D. systems and methods are assumed to generate power through such means. It should also be noted that the working fluid initially should have enough pressure to run the first turbine. However, if there was not enough pressure, the working fluid can be converted to liquid and compressed by pump first and then pass the turbine.

Figure 7:
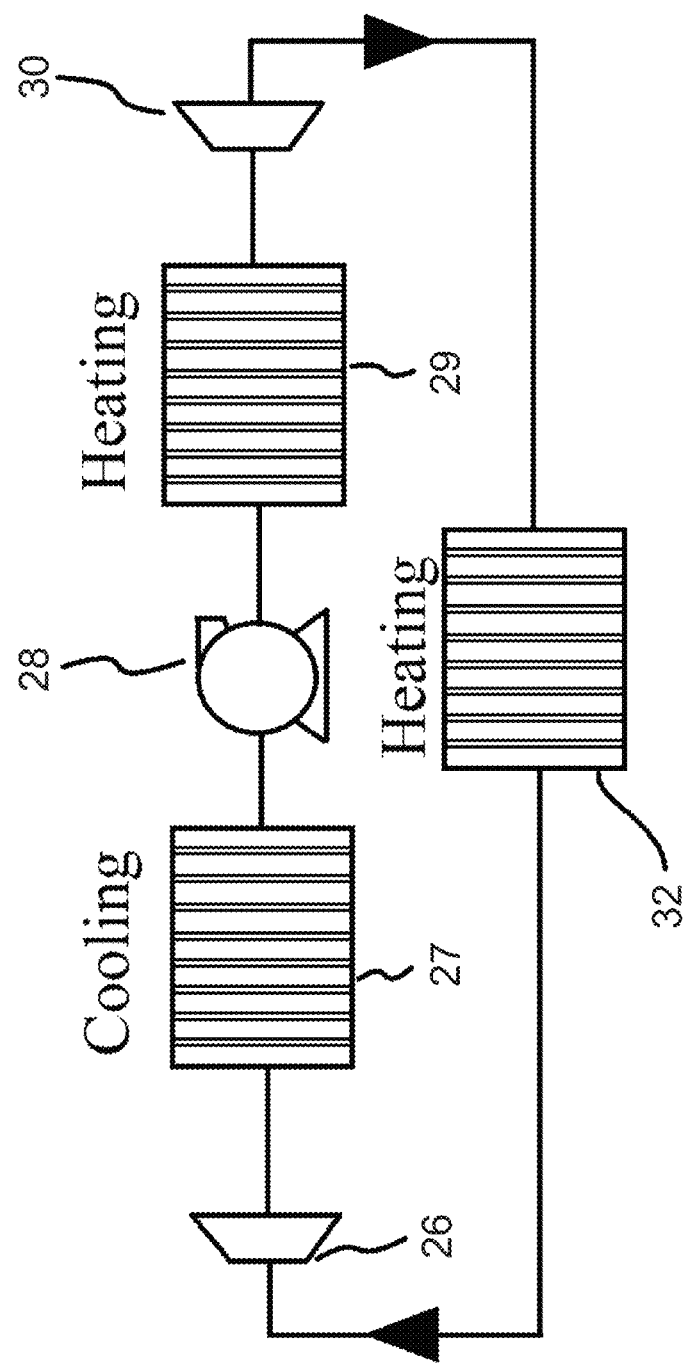
FIG. 7 is a schematic diagram according to an exemplary embodiment of the present disclosure showing the disclosed power generation system using E.I.D. cooling method under closed cycle.

FIG. 7 is a schematic diagram according to an exemplary embodiment of the present disclosure showing the disclosed power generation system using E.I.D. cooling method under closed cycle (hereafter "second method"). The second method is similar to the first one, except that the cycle in this method is closed. After passing through turbine 26, the working fluid enters first heat exchanger 27, where it is cooled down and converted to the liquid state by exchanging heat with an external fluid. After compression by pump 28, the working fluid is heated in second heat exchanger 29 by an external fluid. The working fluid then passes through turbine 30 to enter third heat exchanger 32, where its temperature is raised to an appropriate level to enter turbine 26.

After passing through turbine 26, the working fluid of the second method experiences a pressure and temperature drop as it generates power. Then, the working fluid is cooled down and converted to liquid by another cycle in first heat exchanger 27. The resulting liquid is then compressed by pump 28 and enters second heat exchanger 29, where it is heated by an external fluid. Ultimately, power is generated as it passes through turbine 30. The mechanism for second heat exchanger 29 and turbine 30 can be repeated to generate more power.

Figure 8:
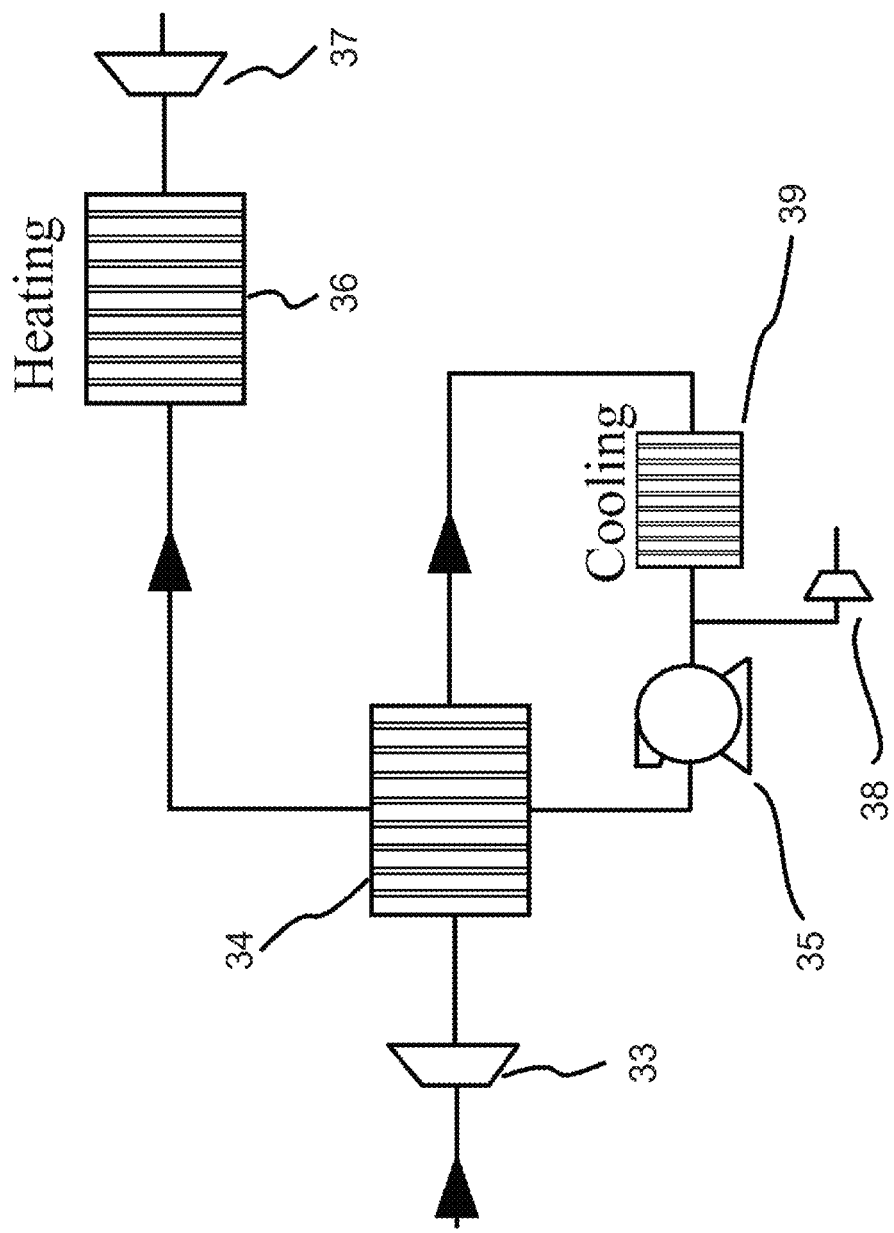
FIG. 8 is a schematic diagram according to another exemplary embodiment of the present disclosure showing the disclosed power generation system using E.I.D. cooling method under open cycle.

FIG. 8 is a schematic diagram according to another exemplary embodiment of the present disclosure showing the disclosed power generation system using E.I.D. cooling method under open cycle (hereafter "third method"). In the third method, which includes an open cycle, the working fluid passes through turbine 33 and enters first heat exchanger 34, where the exhaust fluid from turbine 33 is cooled down on one side and the working fluid, cooled and liquefied by third heat exchanger 39 and compressed by pump 35, is heated on the other. After warming up, the working fluid passes through second heat exchanger 36 and reaches the appropriate temperature to enter turbine 37. Moreover, the non-liquefied gases are removed from the cycle by compressor 38.

In the third method, the working fluid, which may comprise multiple fluid types, generates power as it enters turbine 33. Then, the working fluid enters first heat exchanger 34, where energy is exchanged between the fluid cooled by third heat exchanger 39 and compressed by pump 35 and the output fluid from turbine 33. The fluid compressed by pump 35 enters second heat exchanger 36, where it is heated. Finally, power is generated as the working fluid enters turbine 37. The gases which are not liquefied by Exchangers first heat exchanger 34 and third heat exchanger 39 are removed from the cycle by compressor 38. More power can be generated by absorbing more heat through repeating second heat exchanger 36 with multiple turbines 37 in between.

Figure 9:
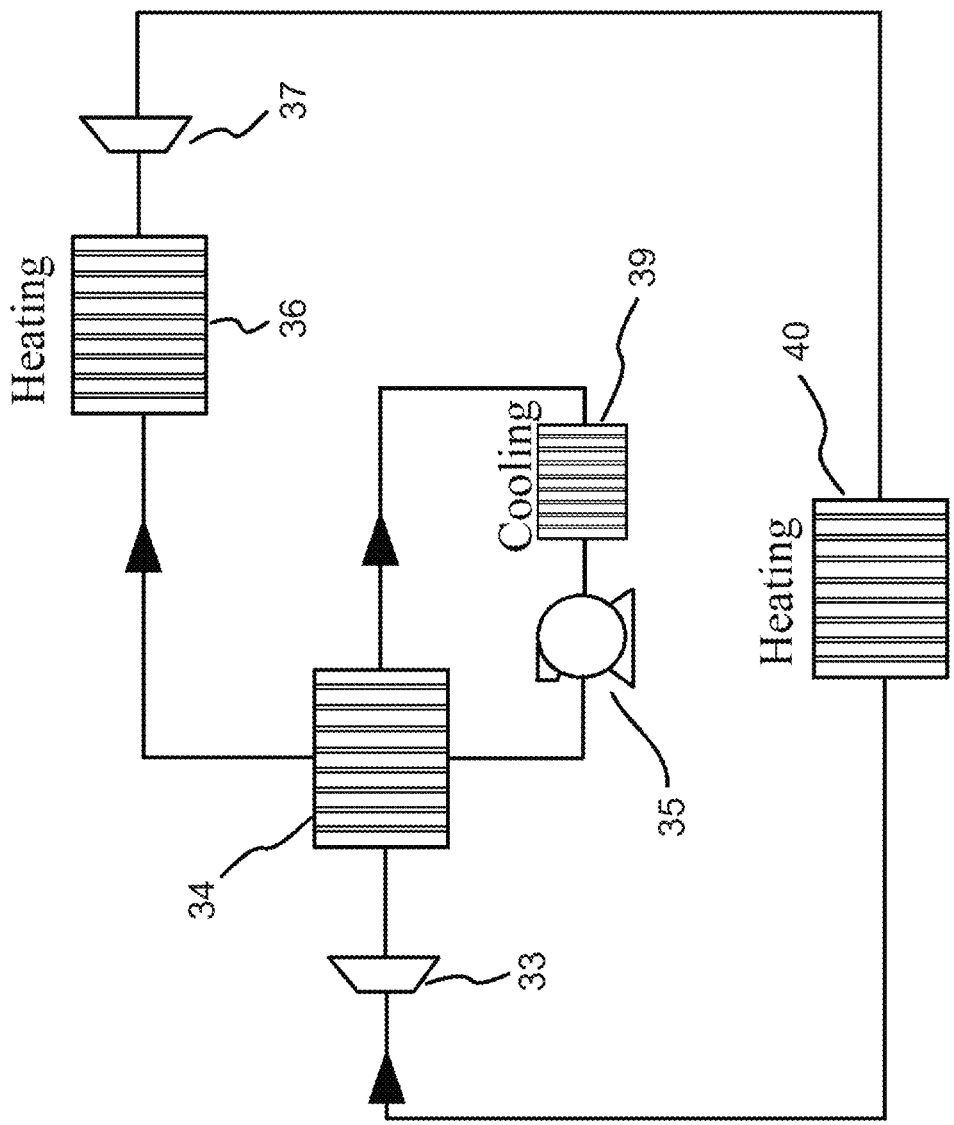
FIG. 9 is a schematic diagram according to another exemplary embodiment of the present disclosure showing the disclosed power generation system using E.I.D. cooling method under closed cycle.

FIG. 9 is a schematic diagram according to another exemplary embodiment of the present disclosure showing the disclosed power generation system using E.I.D. cooling method under closed cycle (hereafter "fourth method"). The fourth method is similar to the third one, except that the cycle in this method is a closed cycle. After passing through turbine 33, the working fluid enters first heat exchanger 34. In fact, the working fluid cools and liquefies by itself at one side and warms up by itself at the other side. The working fluid leaving turbine 33 is cooled down by the cold exhaust fluid from third heat exchanger 39, and the exhaust compressed fluid from pump 35 is heated by first heat exchanger 34. Then, after entering second heat exchanger 36 and reaching the appropriate temperature, the working fluid is heated by an external fluid and enters turbine 37. Finally, the working fluid is heated by a fourth heat exchanger 40 and is transferred to turbine 33.

The working fluid of the fourth method enters turbine 33 and, after generating power, enters first heat exchanger 34, where the fluid is cooled by third heat exchanger 39 and compressed by pump 35 which exchanges heat with the exhaust fluid from turbine 33. The compressed fluid then enters second heat exchanger 36 to be heated by an external fluid, after which it enters turbine 37 to generate power. In the next stage, the fluid is then reheated by a fourth heat exchanger 40 and is transferred back to turbine 33. More power can be generated by repeating second heat exchanger 36, which heats the fluid, and turbine 37, which generates power.

In case of employing a gaseous working fluid in the third and fourth methods, a low-pressure ratio should be considered for first heat exchanger 34 so that the level of dependency on the cooling system is minimized. In case of using a liquid fluid, the pressure ratio can be increased.

The first heat exchanger 34 in the third and fourth methods actually acts similar to kettle heat exchangers or other models in which liquid is converted to gas from one side, and vice versa on the other. This heat transfer process has its own specific limitations. For instance, the pressure and temperature ratio should be within the appropriate range. It is also possible to employ liquid-liquid exchangers, where the fluid is heated up to its critical temperature point.

In closed cycles, the working fluid is selected based on the temperature of the external fluid while the working fluid in open cycles can be a mixture of gases such as air. All cycle devices which have a temperature difference with the environment should be insulated to prevent negative impacts on the cycle efficiency.

Both closed and open cycles are capable of producing water by absorbing heat from the air or steam and converting steam into liquid. For examples, the proposed methods are capable of producing water using at least two types of techniques. In the case where the temperature of the exhaust fluid from the turbines is roughly zero or lower, a heat exchanger can be used to absorb heat from air or steam to produce water and generate power at the same time. Another technique is through desalination, where the surplus electricity from power plants is utilized to desalinate water during off-peak hours.

In case of using the conventional cooling system in the E.I.D. method, which includes a compressor and a turbine, the temperature of the fluid is increased by the compressor and, hence, should be released somehow. The heat release process can be carried out by the heat exchangers titled "Heating" in the figures of the proposed cycle.

Heat exchangers titled "Cooling" in the drawings indicate cooling systems capable of utilizing any fluid with a lower temperature. On the other hand, the dependence of the fourth cycle on the cooling system is determined by efficiency of first heat exchanger 34. The first heat exchanger 34 has major role of being independent from cooling system in so that by increasing heat exchange efficiency the fourth concept needs a smaller cooling system.

Advantages of the Proposed Invention Compared to Previous Inventions and Industrial Applications of the Invention Various methods for conversion of heat to electricity usually operate at temperatures higher than the room temperature. However, in addition to working at high temperatures such as those of fossil fuels combustion, the proposed methods are also capable of converting environmental heat to electricity. On the other hand, since these methods are capable of generating power at a power-plant scale, they can be practically used at any location across the globe where heat exists. As the disclosed concepts are thermal concepts and required heat source also can be provided 24/7, these types of power plant using nowadays technologies can reach to a high capacity factor because of working at full load power.

Absorption of heat from fossil or renewable sources such as seawater and air is the most important advantage of the proposed methods which convert heat to electricity. The significance of this invention lies in its simplicity and its use of equipment which are easier to maintain. By utilizing the fourth method and a cooling system, the E.I.D. power generator is capable of producing fresh water by absorbing heat from air and/or steam.

Polluted gas emission and ocean acidification can be prevented by absorbing heat from polluted gases released by refineries and other factories and converting them to liquid. Moreover, long-term and large-scale utilization of these cycles can lead to lower environmental temperature with lower humidity.

Implementation Method of the Proposed Invention

The embodiments above teach at least four closed- and open-cycle methods for generating power using a cooling system. Considering the difficulties such as cost of repairing and computational complexities in the E.I.D. cooling system, the four proposed methods are different in their dependency on the cooling system, such that the first and second methods require a considerable higher amount of cooling for power generation compared to the third and fourth methods. In other words, the fourth cycle is least dependent on the cooling system.

As mentioned before, the cooling process can be carried out using the disclosed E.I.D. system. Therefore, by replacing the cooling exchanger with the third heat exchanger (e.g., heat exchanger 16 in FIG. 2) of the E.I.D. system or the heat absorber exchanger, the proposed power generation methods can be incorporated into the E.I.D. system to achieve a combined performance. For instance, the cooling heat exchanger in four methods can absorb heat from heat exchangers 27 and 39. In general, output fluid from turbines of the four disclosed methods has low temperature. Thus, we could use that to reduce temperature of working fluid of different concept with different working fluid.

It is important to note that the working fluid of the E.I.D. method should be at a considerably lower temperature compared to the four proposed methods so that it can cool down the power generation systems for a consistent performance. For instance, in case of using hydrogen as the working fluid for E.I.D. cooling system, other working fluids such as nitrogen, carbon dioxide, oxygen, and ammoniac and steam in different cycles can be converted to liquid.

Figure 10:
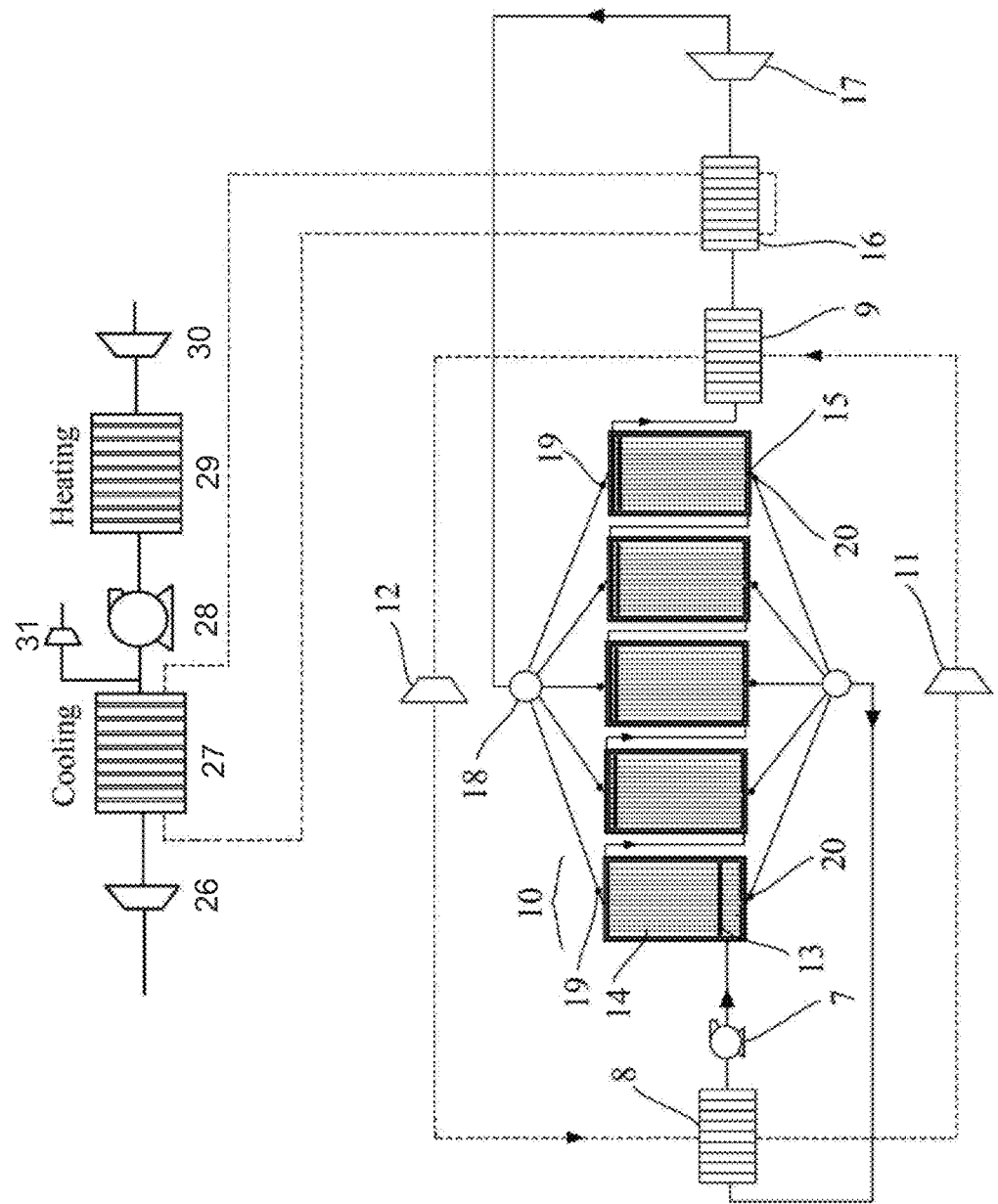
FIG. 10 is a schematic diagram according to an exemplary embodiment of the present disclosure showing a closed E.I.D. cycle combined with first method.

FIG. 10 shows a closed E.I.D. cooling system combined with first method according to one embodiment of the present disclosure. As shown by the figure, the third heat exchanger 16 of the E.I.D. cooling system can cool down the cooling exchanger 27 of the power generation methods. In fact, all power generation methods can be maintained at a low temperature by the E.I.D. system. Moreover, the third heat exchanger 16 can also be fully replaced by the cooling exchanger 27.

Figure 11:
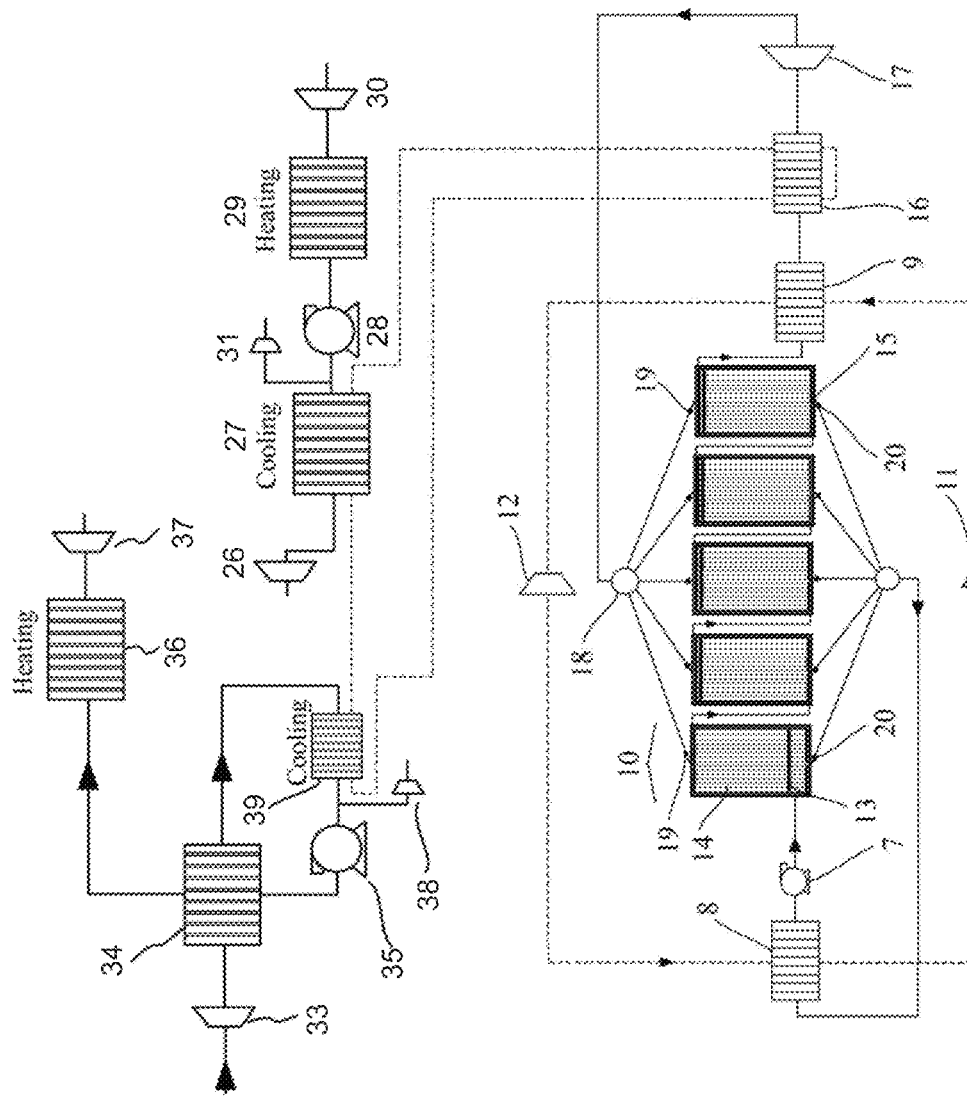
FIG. 11 is a schematic diagram according to an exemplary embodiment of the present disclosure showing combination of E.I.D. with proposed first and third methods with respect to the minimum temperature of the cycles.

FIG. 11 shows combination of E.I.D. cycle with the proposed first and third methods with respect to the minimum temperature of the cycles. Although the third heat exchanger 16 of the E.I.D cooling system operates at a low temperature to be capable of cooling multiple fluids at different temperatures, the E.I.D. cooling system uses multiple exchangers of the same type, each assigned to a different fluid at different temperatures. For instance, operating at a minimum temperature of −110 C by utilizing nitrogen (FIG. 4A), the third heat exchanger 16 is capable of controlling the temperature of carbon dioxide, ammonia, R12, and steam, which are, respectively, the working fluids used in the respective exchangers considering the minimum temperature of the working fluid in the four proposed methods. This is feasible only when cooling of the fluid does not absorb a considerable amount of energy in each stage so as to be able to cool all the fluids. As shown by the figure, the cooling system consumes a considerable portion of the generated power and, in fact, absorbs a high amount of energy, which can be considered a drawback.

Figure 12:
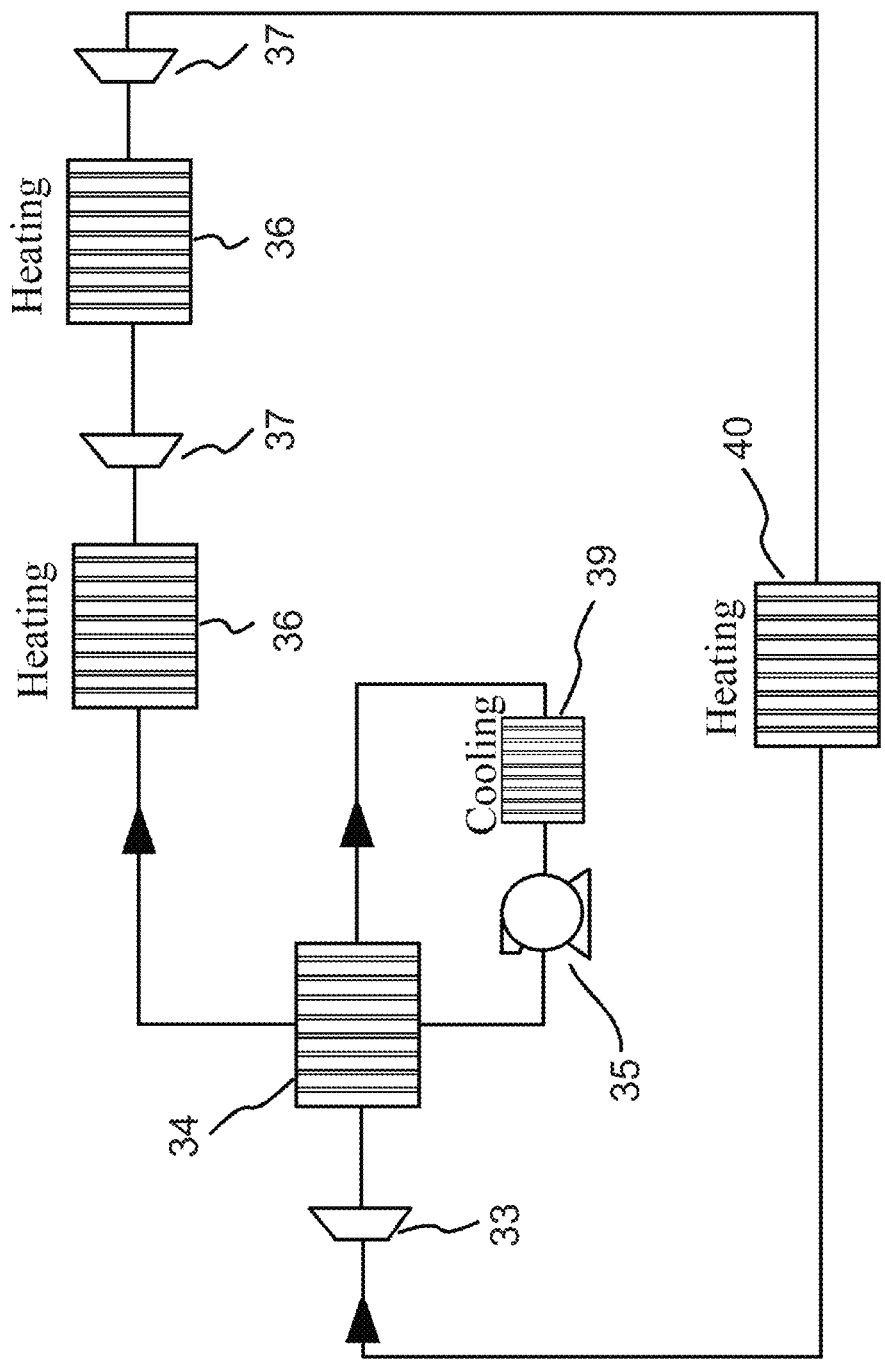
FIG. 12 is a schematic diagram according to an exemplary embodiment of the present disclosure showing fourth method with a closed cycle using multiple heat absorbing heat exchangers.

FIG. 12 shows fourth method with a closed cycle using multiple heat absorbing heat exchangers. The generated power can be increased by increasing the number of turbines and exchangers and, subsequently, absorbing more heat by the proposed cycles. However, as its drawback, the costs are increased accordingly. For example, with regards to the third and fourth methods, instead of using the E.I.D. cooling method, the conventional cooling method can be used, in which a multi-stage compressor along with a cooling system and turbine are employed. In fact, this is feasible only when the operating pressure ratios of turbines 33 and 37 as well as pump 35 are low and, in addition, the efficiency of the first heat exchanger 34 is considerably high. Otherwise, the E.I.D. cooling method should inevitably be used. Nevertheless, the E.I.D. method can be used to achieve the highest thermal efficiency.

Figure 13:
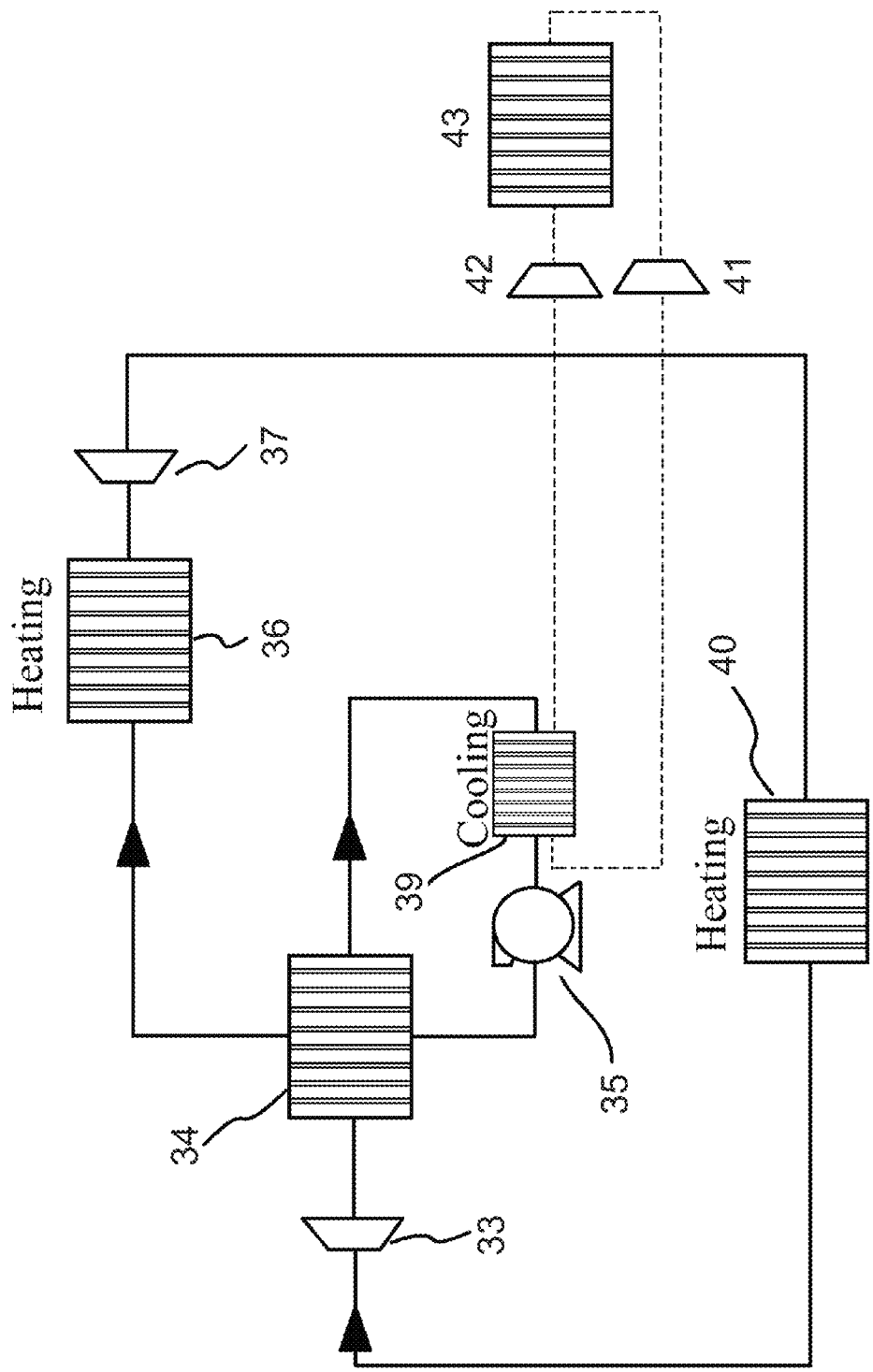
FIG. 13 is a schematic diagram according to an exemplary embodiment of the present disclosure showing the fourth method with a closed cycle incorporating the conventional cooling method.
Figure 14:
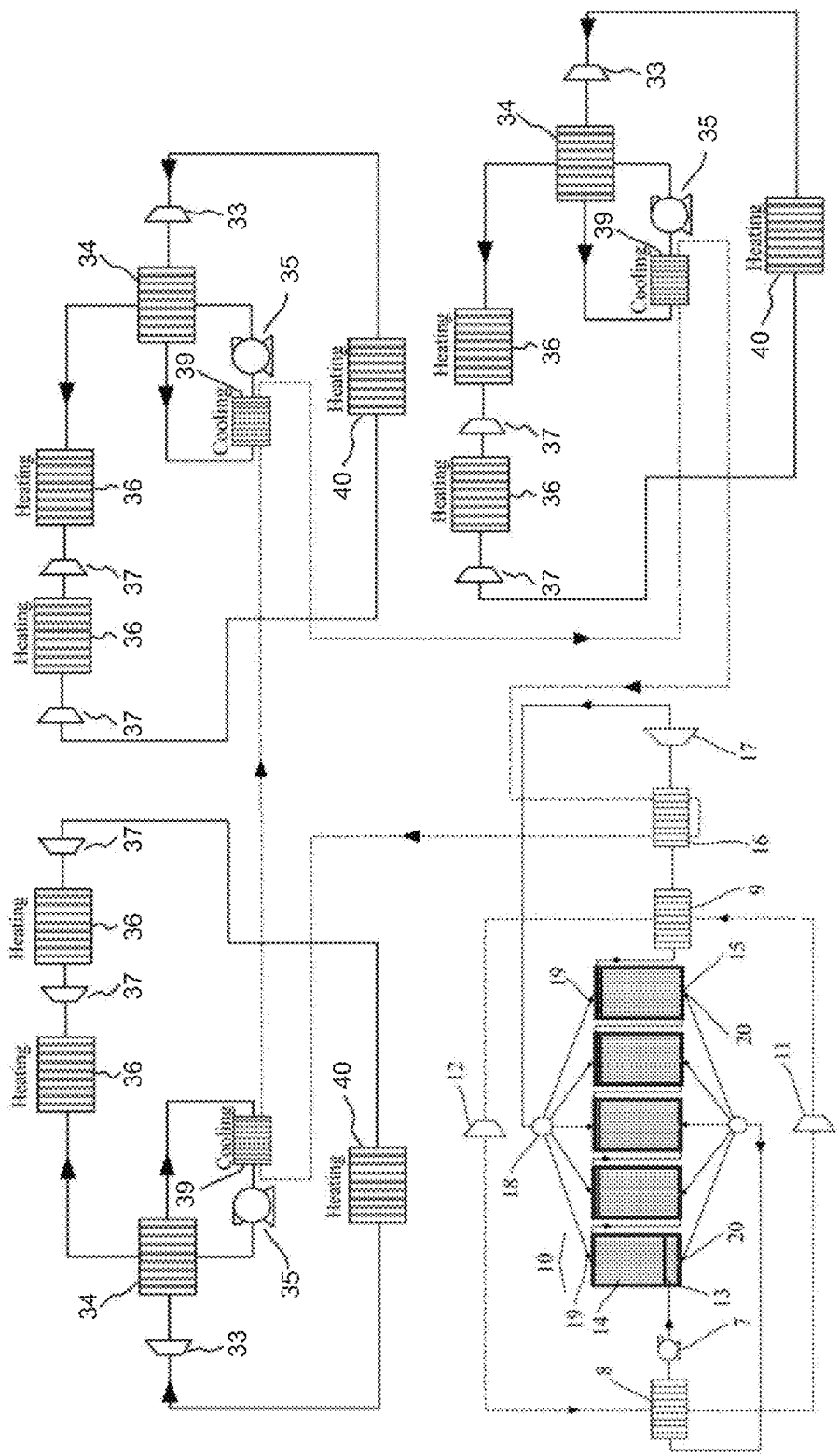
FIG. 14 is a schematic diagram according to an exemplary embodiment of the present disclosure showing the E.I.D. cycle combined with the multi-stage fourth method of power generation.

FIG. 13 shows the fourth method with a closed cycle incorporating the conventional cooling method. If employed, the conventional cooling system (turbine 42, compressor 41, heat exchanger 43 and cooling exchanger 7) must cool multiple cycles so that the generated power surpasses the consumed power. This method can only be used in the fourth method and the efficiency of first heat exchanger 34 in this method should be roughly 100 percent. In addition, heat should be transferred to an appropriate environment, which is carried out by heat exchanger 43. For instance, the aforementioned appropriate environment can be the exhaust of turbines with a lower temperature.

All the proposed power generation methods incorporate turbines and compressors. Therefore, the following methods should be used to reduce power consumption and increase power generation: 1) Employing multi-stage compressors along with intermediate cooling. The cooling exchanger can be cooled by any fluid with a lower temperature or by employing the E.I.D. method which also generates power; 2) Employing multiple turbines and heating exchangers which receive their energy from any fluid with a higher temperature. In case of operating at temperatures below zero, the energy can be received from air. In case a cooling system is employed, regardless of its type, heat exchanger 39 can be eliminated in the third and fourth methods and the flows can be passed through a cooling exchanger by considering its required cooling temperature.

FIG. 13 shows an exemplary E.I.D. cycle combined with a multi-stage fourth method of power generation. The cooling system in FIG. 13 cools three cycles of the fourth method. The objective is to cool the cycles of the fourth method which uses different fluid cycles with different operating temperatures. For example, a cooling system operating on nitrogen is capable of cooling cycles with carbon dioxide, ammoniac, R12, R22 working fluids. As shown by the figure, water can be produced by passing humid air or steam through heating exchangers, which are, in turn, capable of cooling other fluids.

As pointed out earlier, cooling of the fourth methods is carried out by the exchanger titled "Cooling". This exchanger could be the third heat exchanger 16 of E.I.D. system disclosed in FIGS. 2 and 5, which can be used by any exhaust of the turbine with a lower temperature. Thus, the cooling heat exchanger also can reduce temperature of working fluid using every lower temperature fluid beside the heat exchanger 16.

INDUSTRIAL APPLICATION OF THE INVENTION

Due to their simplicity and low level of complexity, the proposed methods can be employed for electricity generation at a power-plant scale. By utilizing a cooling system, these methods are capable of producing water and generating power from renewable heat sources even at room temperature. In addition, they can control the amount of power generated to balance the load at peak hours and allocate the surplus power to different uses such as desalination or electrolysis of water to produce hydrogen and oxygen.

The proposed methods can also be utilized as cooling systems. Moreover, the high-efficiency cooling system can be used to generate power roughly at any location on across the globe or, in fact, at any location where heat exists. On the other hand, although heat is considered a problem to the system in many industries, it can be utilized in this powerful cooling method at a large-scale.

Today, the renewable power generation methods may not usually perform 24/7. For instance, wind is not always accessible and sun does not shine 24 hours a day. The proposed methods, however, are capable of generating power from air without any limitation in its temperature. On the other hand, producing water from air depends on its humidity. These methods can be of great importance and practicality if implemented.

The polluting gases in the atmosphere and/or flares of refineries, which are poisonous, can be liquefied by converting heat to electricity and cooling them. The liquefied fluids can even be injected into oil wells to increase exploitation.

As a crucial need, the importance of oil industry in today's world is growing. However, the pressure of the oil reservoirs gradually decreases due to enhanced oil extraction. In order to increase this pressure, gas is injected into the reservoir. For example, injection of liquid nitrogen or carbon dioxide is considered a way of enhancing oil extraction. The proposed cycle is capable of liquefying any gas type. Therefore, costs can be considerably decreased by employing this method to liquefy gases and inject them into the reservoir. Moreover, the different exhaust harmful gases by the refineries, which are usually burnt in the air and emitted in the atmosphere, can be liquefied.

All power-plants require cooling systems. This can be a beginning step for further investigation of such plans so as to evaluate the advantages and drawbacks of these methods in practice.

Water production along with power generation are the most significant advantages of the proposed processes in this invention. Surely, these processes are not perfect and require advanced control systems which are easily feasible with today's technological advances. All countries have a crucial need to energy, especially Iran, which is experiencing climatic changes and dealing with the consequences of global warming. These effects are going to be more conspicuous in the future, therefore, widely employing power generation methods in all countries can be a step forward to tackle such problems.

Based on the analyses, the water produced from air by the proposed method for a 1000-Megawatt power plant is roughly 700 m$^3$ per hour (which is subject to change). This amount of water can supply the daily need of humans to water. However, the water demanded for agriculture and industry can be obtained by desalination and treatment of seawater by employing the different methods available today and by using the surplus generated power of the powerplant.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A system for converting heat to electrical power comprising:
    a cooling mechanism;
    a pump that compresses a fluid;
    a first heat exchanger that reduces the fluid's temperature through the cooling mechanism before the fluid enters the pump;
    a plurality of cylinders, where each cylinder comprises a reciprocating piston and is being injected with the fluid;
    a pipe that is configured to be in contact with the plurality of cylinders allowing the fluid from the pump to pass through the pipe and contact the plurality of cylinders' casings, and to absorb energy of the fluid in the plurality of cylinders, causing the fluid in the plurality of cylinders to expand;
    a second heat exchanger that increases the fluid's temperature through the cooling mechanism after the fluid exits the plurality of cylinders;
    wherein the reciprocating piston for each of the plurality of cylinders moves when the fluid is injected into the plurality of cylinders or when the fluid's temperature changes in the plurality of cylinders; and
    wherein power is generated when the reciprocating piston moves.

2. The system of claim 1 further comprises a stirring system implemented within each of the plurality of cylinders to facilitate heat transfer.

3. The system of claim 1, wherein the reciprocating piston for each of the plurality of cylinders is connected to a hydraulic system and power is generated when the reciprocating piston moves.

4. The system of claim 1, wherein the cooling mechanism comprises a compressor that compresses a second fluid between the first heat exchanger and the second heat exchanger, and a first turbine that expands the second fluid and reduces the second fluid's temperature.

5. The system of claim 1 further comprises a third heat exchanger that is connected to an additional power generating system to generate additional electrical power.

6. The system of claim 5, wherein the additional power generating system comprises a first turbine that decreases a working fluid's pressure, a cooling heat exchanger that cools down the working fluid, a pump that compresses the working fluid, a heating heat exchanger that heats the working fluid, and a second turbine that generates power.

7. The system of claim 6, wherein the additional power generating system further comprises a compressor that removes gases which are not converted to liquid in the cooling heat exchanger.

8. The system of claim 5, wherein the additional power generating system comprises a first turbine that decreases a working fluid's pressure, a fourth heat exchanger that exchanges energy between the working fluid cooled by a cooling heat exchanger and compressed by a pump and the working fluid output by the first turbine, a heating heat exchanger that heats the working fluid, and a second turbine that generates power.

9. The system of claim 8, wherein the additional power generating system further comprises a compressor that removes gases which are not converted to liquid in the cooling heat exchanger or the fourth heat exchanger.

10. The system of claim 6, wherein the second turbine generates power by connecting to a gearbox and a rotary power generator.

11. A system for converting heat to electrical power comprising:
    a cooling mechanism;
    a first pump that compresses a first fluid;
    a first heat exchanger that reduces the first fluid's temperature through the cooling mechanism before the first fluid enters the first pump;
    a plurality of cylinders, where each cylinder comprises a reciprocating piston and is being injected with the first fluid;
    a pipe that is configured to be in contact with the plurality of cylinders allowing the first fluid from the pump to pass through the pipe and contact the plurality of cylinders' casings, and to absorb energy of the first fluid in the plurality of cylinders, causing the first fluid in the plurality of cylinders to expand;
    a second heat exchanger that increases the first fluid's temperature through the cooling mechanism after the first fluid exits the plurality of cylinders;
    a third heat exchanger that is connected to an additional power generating system to generate additional electrical power, where the additional power generating system comprises a first turbine that decreases a second fluid's pressure, a cooling heat exchanger that cools down the second fluid, a second pump that compresses the second fluid, a heating heat exchanger that heats the second fluid, and a second turbine that generates power; and
    wherein the reciprocating piston for each of the plurality of cylinders moves when the first fluid is injected into the plurality of cylinders or when the first fluid's temperature changes in the plurality of cylinders; and
    wherein power is generated when the reciprocating piston moves.

12. The system of claim 11 further comprises a stirring system implemented within each of the plurality of cylinders to facilitate heat transfer.

13. The system of claim 11, wherein the reciprocating piston for each of the plurality of cylinders is connected to a hydraulic system and power is generated when the reciprocating piston moves.

14. The system of claim 11, wherein the cooling mechanism comprises a compressor that compresses a third fluid between the first heat exchanger and the second heat exchanger, and a third turbine that expands the third fluid and reduces the third fluid's temperature.

15. The system of claim 11, wherein the additional power generating system further comprises a compressor that removes gases which are not converted to liquid in the cooling heat exchanger.

16. The system of claim 11, wherein the second turbine generates power by connecting to a gearbox and a rotary power generator.

17. A system for converting heat to electrical power comprising:
    a cooling mechanism;
    a first pump that compresses a first fluid;
    a first heat exchanger that reduces the first fluid's temperature through the cooling mechanism before the first fluid enters the first pump;
    a plurality of cylinders, where each cylinder comprises a reciprocating piston and is being injected with the first fluid;
    a pipe that is configured to be in contact with the plurality of cylinders allowing the first fluid from the pump to pass through the pipe and contact the plurality of cylinders' casings, and to absorb energy of the first fluid in the plurality of cylinders, causing the first fluid in the plurality of cylinders to expand;
    a second heat exchanger that increases the first fluid's temperature through the cooling mechanism after the first fluid exits the plurality of cylinders;
    a third heat exchanger that is connected to an additional power generating system to generate additional electrical power, where the additional power generating system comprises a first turbine that decreases a second fluid's pressure, a fourth heat exchanger that exchanges energy between the second fluid cooled by a cooling heat exchanger and compressed by a pump and the second fluid output by the first turbine, a heating heat exchanger that heats the second fluid, and a second turbine that generates power;
    wherein the reciprocating piston for each of the plurality of cylinders moves when the first fluid is injected into the plurality of cylinders or when the first fluid's temperature changes in the plurality of cylinders; and
    wherein power is generated when the reciprocating piston moves.

18. The system of claim 17, wherein the reciprocating piston for each of the plurality of cylinders is connected to a hydraulic system and power is generated when the reciprocating piston moves.

19. The system of claim 17, wherein the cooling mechanism comprises a compressor that compresses a third fluid between the first heat exchanger and the second heat exchanger, and a third turbine that expands the third fluid and reduces the third fluid's temperature.

20. The system of claim 17, wherein the additional power generating system further comprises a compressor that removes gases which are not converted to liquid in the cooling heat exchanger or the fourth heat exchanger.

* * * * *